United States Patent
Ishidera

(10) Patent No.: US 9,019,312 B2
(45) Date of Patent: Apr. 28, 2015

(54) DISPLAY ORIENTATION CONTROL METHOD AND ELECTRONIC DEVICE

(75) Inventor: Nobutaka Ishidera, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 824 days.

(21) Appl. No.: 13/067,413

(22) Filed: May 31, 2011

(65) Prior Publication Data

US 2012/0001943 A1    Jan. 5, 2012

(30) Foreign Application Priority Data

Jul. 2, 2010 (JP) ................................. 2010-151559

(51) Int. Cl.
G06F 3/0346 (2013.01)

(52) U.S. Cl.
CPC .................... *G06F 3/0346* (2013.01)

(58) Field of Classification Search
CPC ............ G06F 1/162; G06F 2200/1614; G09G 2340/0492
See application file for complete search history.

(56) References Cited

U.S. PATENT DOCUMENTS

| | | |
|---|---|---|
| 2003/0134665 A1 | 7/2003 | Kato et al. |
| 2008/0129666 A1 | 6/2008 | Shimotono et al. |
| 2009/0048001 A1 | 2/2009 | Mihara et al. |
| 2010/0033422 A1 | 2/2010 | Mucignat et al. |
| 2010/0117993 A1* | 5/2010 | Kent ............................ 345/177 |
| 2010/0188331 A1* | 7/2010 | Wehrenberg et al. ......... 345/156 |

FOREIGN PATENT DOCUMENTS

| | | |
|---|---|---|
| CN | 1422051 A | 6/2003 |
| CN | 101196777 A | 6/2008 |
| JP | 2000-122635 | 4/2000 |
| JP | 2004-219791 | 8/2004 |
| JP | 2008-131616 | 6/2008 |
| JP | 2008-139711 | 6/2008 |
| JP | 2008-281834 | 11/2008 |
| JP | 2009-49512 | 3/2009 |
| JP | 2000-250434 | 9/2009 |
| KR | 10-2006-0032694 | 4/2006 |

OTHER PUBLICATIONS

Extended European Search Report dated Oct. 17, 2011 in Application No. 11167762.1.
Chinese Office Action issued Sep. 4, 2013 in corresponding Chinese Application No. 201110160448.6.
(Continued)

*Primary Examiner* — Zhengxi Liu
(74) *Attorney, Agent, or Firm* — Staas & Halsey LLP

(57) ABSTRACT

In an electronic device, a control unit determines a state of changes of tilt angles detected by a tilt sensor, modifies at least one of control information stored in a control information storage unit, and a tilt direction and tilt angle detected by the tilt sensor, depending on the determined state of the changes, and changes the display orientation of a display unit on the basis of the modification result. The tilt sensor detects the tilt direction and tilt angle of the display unit with respect to the vertical downward direction. The control information storage unit stores the control information indicating correlations between display orientations of the display unit and tilts of the own device. A detected tilt data storage unit stores detected tilt data indicating a history of tilt directions and tilt angles detected by the tilt sensor.

6 Claims, 36 Drawing Sheets

(56) References Cited

OTHER PUBLICATIONS

Espacenet English Abstract of Chinese Publication No. 1422051 A, Published Jun. 4, 2003.
Espacenet English Abstract of Chinese Publication No. 101196777 A, Published Jun. 11, 2008.
Japanese Patent Abstracts, Publication No. 2009-049512, published Mar. 5, 2009.
Japanese Patent Abstracts, Publication No. 2004-219791, published Aug. 5, 2004.
English language translation of abstract, Korean Publication No. 10-2006-0032694, published Apr. 18, 2006.
Korean Notice of Preliminary Rejection issued Dec. 5, 2012 in corresponding Korean Patent Application No. 10-2011-0054916.
Patent Abstracts of Japan, Publication No. 2000-122635, Published Apr. 28, 2000.
Patent Abstracts of Japan, Publication No. 2000-250434, Published Sep. 14, 2000.
Patent Abstracts of Japan, Publication No. 2008-131616, Published Jun. 5, 2008.
Patent Abstracts of Japan, Publication No. 2008-139711, Published Jun. 19, 2008.
Patent Abstracts of Japan, Publication No. 2008-281834, Published Nov. 20, 2008.
Japanese Patent Office Action dated Dec. 24, 2013 in Appln. No. 2010-151559.

* cited by examiner

CONTROL TABLE 103a

| ROTATION ANGLE | ANGLE RANGE AROUND X-AXIS | ANGLE RANGE AROUND Y-AXIS |
|---|---|---|
| 0° | −10° TO +10° | −40° TO +90° |
| +90° | −90° TO −11° | −40° TO +90° |
| +180° | −91°≧X, +91°≦X , −41°≧Y   OR   +91°≦Y | |
| −90° | +11° TO +90° | −40° TO +90° |

FIG. 6

DETECTED TILT TABLE                    104a

| NO. | ANGLE AROUND X-AXIS | ANGLE AROUND Y-AXIS |
|---|---|---|
| 1 | +23° | −14° |
| 2 | +18° | −16° |
| 3 | +13° | −7° |
| 4 | +8° | +2° |
| 5 | +3° | +7° |
| 6 | −2° | +21° |
| ⋮ | ⋮ | ⋮ |
| 30 | +4° | −12° |

FIG. 7

CONTROL TABLE 203a

| SETTING | ROTATION ANGLE | ANGLE RANGE AROUND X-AXIS | ANGLE RANGE AROUND Y-AXIS |
|---|---|---|---|
| HIGHER HORIZONTAL SENSITIVITY | 0° | −10° TO +10° | −40° TO +90° |
| | +90° | −90° TO −11° | −40° TO +90° |
| | +180° | −91°≧X, +91°≦X, −41°≧Y OR +91°≦Y | |
| | −90° | +11° TO +90° | −40° TO +90° |
| LOWER HORIZONTAL SENSITIVITY | 0° | −40° TO +40° | −40° TO +90° |
| | +90° | −90° TO −41° | −40° TO +90° |
| | +180° | −91°≧X, +91°≦X, −41°≧Y OR +91°≦Y | |
| | −90° | +41° TO +90° | −40° TO +90° |

FIG. 20

CORRECTION TABLE 305a

| ITEM | CORRECTION ANGLE |
|---|---|
| XPlus | +10 |
| XMinus | −10 |
| YPlus | +10 |
| YMinus | −10 |

FIG. 28

DISPLAY ORIENTATION CONTROL METHOD AND ELECTRONIC DEVICE

CROSS-REFERENCE TO RELATED APPLICATION

This application is based upon and claims the benefits of priority of the prior Japanese Patent Application No. 2010-151559, filed on Jul. 2, 2010, the entire contents of which are incorporated herein by reference.

FIELD

The embodiments discussed herein are related to an electronic device, a computer-readable medium storing a control program, and a control method.

BACKGROUND

At present, there are electronic devices including information processing apparatuses such as tablet and convertible notebook computers (laptop computers) and portable information terminals. Out of these, there are electronic devices that are designed to be able to change the display orientations of their display screens according to the orientations of the own electronic devices. These electronic devices are known for a function of changing the display orientation of a display screen according to user operation.

In order to detect the orientation of an electronic device, the electronic device is equipped with a sensor such as an accelerometer sensor or gyro sensor, which detects the direction of gravity and the direction of operation. This sensor enables the electronic device to automatically adjust the display orientation of the display screen when rotated by a user. Therefore, the user is always able to view the display screen and operate the electronic device in a proper orientation.

Further, there are electronic devices that provide a plurality of thresholds for determining whether to change a display orientation. By selecting appropriate thresholds, the user is able to have desired setting for change of the display orientation. There are also electronic devices that detect the tilts of the own electronic devices on the basis of a history of tilts detected by a tilt sensor so as not to react to some shakes and movements made in a short time.

Please refer to Japanese Unexamined Patent Application Publications Nos. 2009-49512 and 2004-219791.

However, it is troublesome for a user to change settings by manually selecting thresholds depending on situation.

SUMMARY

According to an aspect of the invention, there is provided an electronic device which includes a display unit to display information, a tilt sensor to detect a tilt direction and tilt angle of the display unit with respect to a vertical downward direction, a detected tilt data storage unit to store detected tilt data that indicates a history of tilt directions and tilt angles detected by the tilt sensor, a control information storage unit to store control information indicating correlations between display orientations of the display unit and tilts of the own electronic device to be detected by the tilt sensor, and a control unit to analyze the detected tilt data to capture a state of changes of the tilt angles detected by the tilt sensor, modify the control information stored in the control information storage unit, the tilt direction and tilt angle detected by the tilt sensor, or a combination thereof, depending on the captured state of the changes of the tilt angles, and change a display orientation of the display unit on the basis of a result of the modification.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates a control table according to the second embodiment;

FIG. 7 is a detected tilt table according to the second embodiment;

FIG. 20 illustrates a control table according to the third embodiment;

FIG. 28 illustrates a correction table according to the fourth embodiment;

DESCRIPTION OF EMBODIMENTS

Figure 1:
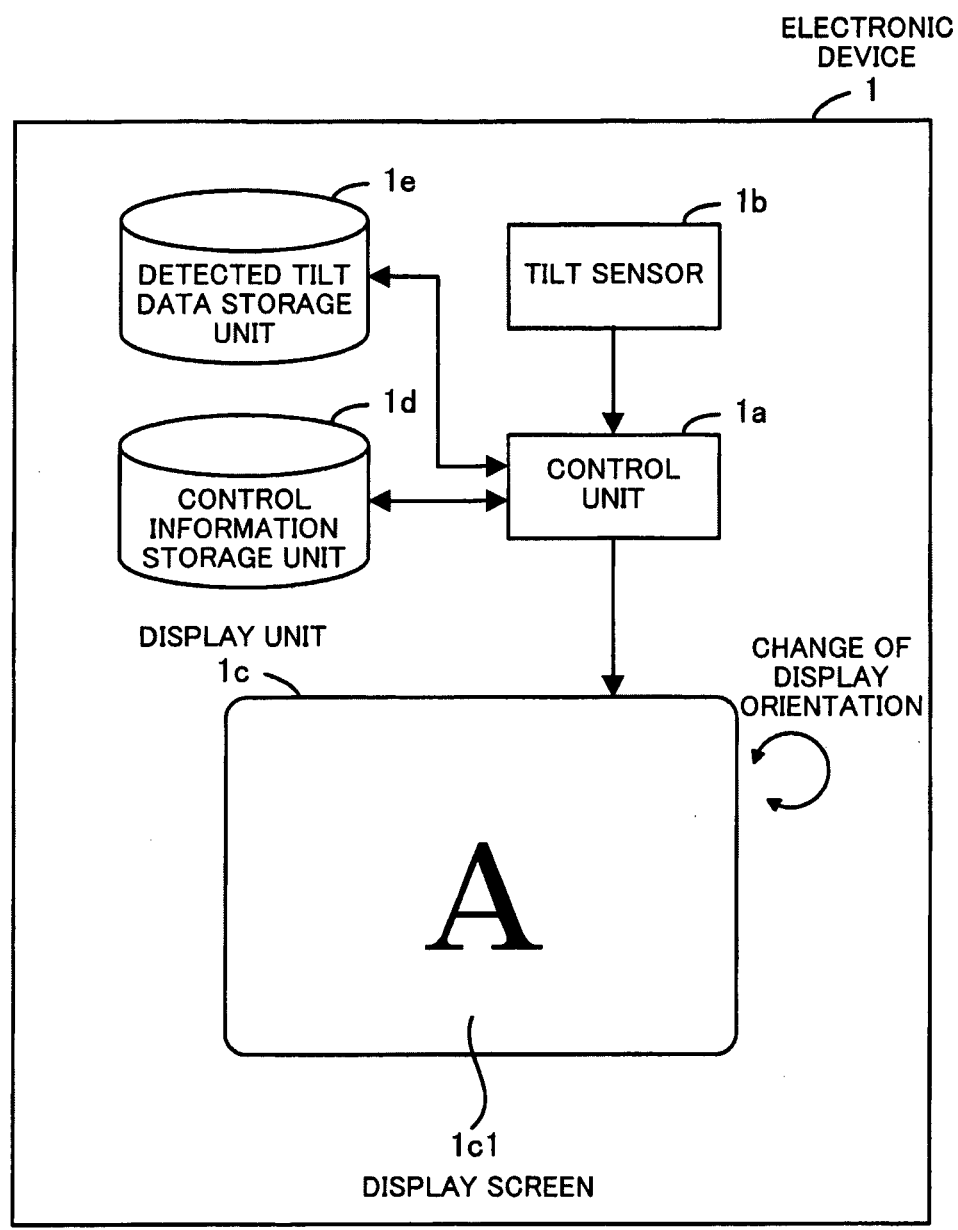
FIG. 1 illustrates an electronic device according to a first embodiment.

Embodiments of the present invention will now be described with reference to the accompanying drawings, wherein like reference numerals refer to like elements throughout.

First Embodiment

FIG. 1 illustrates an electronic device according to a first embodiment. The illustrated electronic device 1 is designed to be able to change the display orientation of a display unit 1c according to an orientation of the display unit 1c of the electronic device 1. This electronic device 1 includes a control unit 1a, a tilt sensor 1b, the display unit 1c, a control information storage unit 1d, and a detected tilt data storage unit 1e. The display unit 1c displays the display screen 1c1.

The control unit 1a analyzes detected tilt data to capture the state of changes of tilt angles detected by the tilt sensor 1b. The control unit 1a then modifies at least one of control information stored in the control information storage unit 1d and a tilt direction and tilt angle detected by the tilt sensor 1b, depending on the captured state of the changes in tilt angle. On the basis of the modification result, the control unit 1a then changes the display orientation of the display unit 1c. With this approach, it becomes possible to adjust the change of the display orientation of the display screen 1c1 depending on whether changes in tilt angle of the electronic device 1 are large or small.

The tilt sensor 1b detects a tilt direction and tilt angle of the display unit 1c that displays information, with respect to the vertical downward direction. For example, the tilt sensor 1b uses an accelerometer sensor or gyro sensor provided in the display unit 1c to detect the direction of gravity and the direction of operation, and acquires the tilt direction and tilt angle of the display unit 1c as a tilt direction and tilt angle of the electronic device 1.

The display unit 1c is provided with the display screen 1c1 for displaying information. This display unit 1c is able to change the display orientation of the display screen 1c1 in a plurality of directions. As an example, the display unit 1c is able to display information such as a letter in four directions: "upright", "upside down", "rotated left", and "rotated right". In this connection, this display unit 1c may be designed to display information in any directions on the display screen 1c1. In addition, information to be displayed on the display unit 1c includes graphic information such as motion pictures and still pictures, as well as text information.

The control information storage unit 1d stores control information that indicates correlations between display orientations of the display unit 1c and tilts of the electronic device 1 to be detected by the tilt sensor 1b. On the basis of the correlations between tilts of the electronic device 1 (tilts of the display unit 1c) and display orientations of the display unit 1c, indicated by the control information, the electronic device 1 changes the display orientation of the display screen 1c1.

The detected tilt data storage unit 1e stores detected tilt data that indicates a history of tilt directions and tilt angles detected by the tilt sensor 1b. On the basis of the past tilt directions and tilt angles of the electronic device 1, indicated by the detected tilt data, it is determined whether changes in tilt angle of the electronic device 1 are large or small.

The above configuration makes it possible to appropriately adjust the change of the display orientation of a display screen.

Second Embodiment

Figure 2:
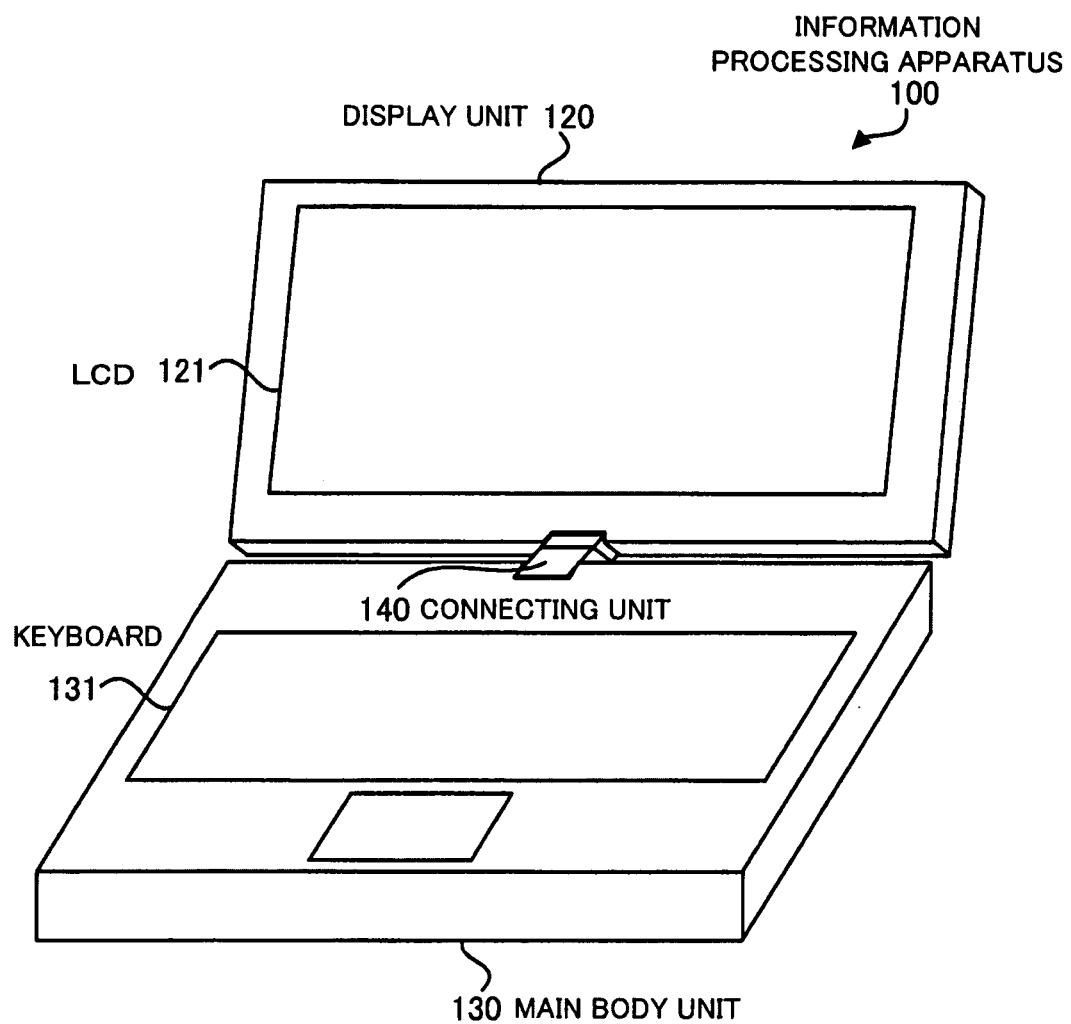
FIGS. 2 and 3 illustrate an appearance of an information processing apparatus according to a second embodiment.
Figure 3:
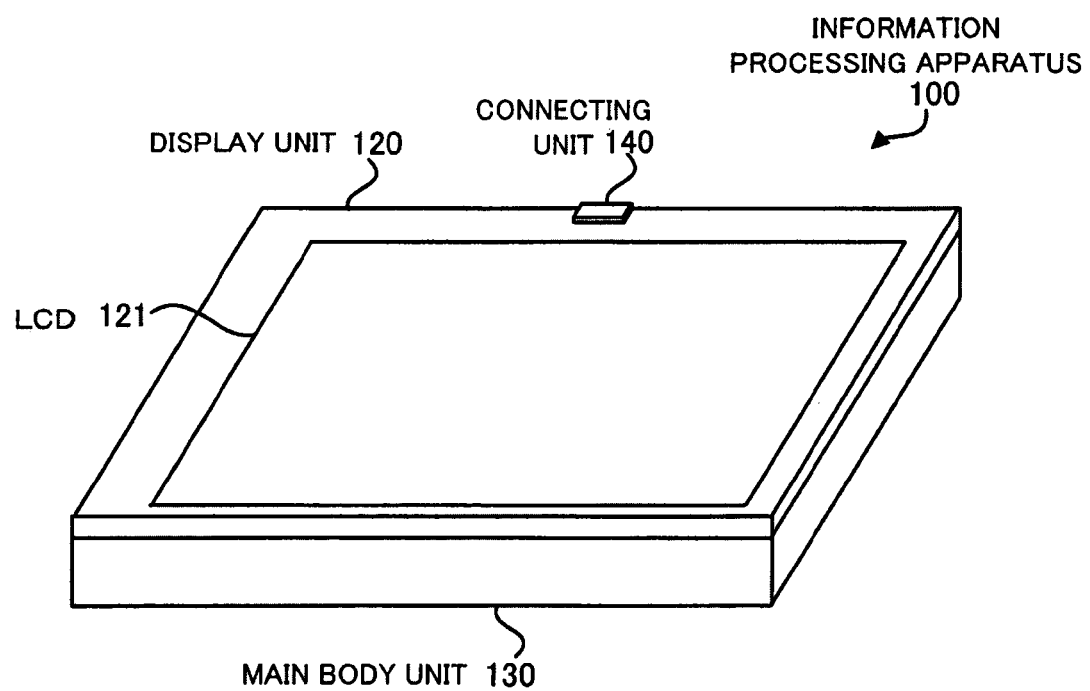

FIGS. 2 and 3 illustrate an appearance of an information processing apparatus according to a second embodiment. FIG. 2 illustrates an information processing apparatus 100 with a display unit 120 open (normal use state), whereas FIG. 3 illustrates the information processing apparatus 100 with the display unit 120 closed and a Liquid Crystal Display (LCD) 121 facing upward (tablet state).

The illustrated information processing apparatus 100 is a convertible notebook personal computer that is switched among normal use state, tablet state, and unused state. The information processing apparatus 100 has a display unit 120 provided with the LCD 121, a main body unit 130 provided with electronic components such as a keyboard 131 and a CPU, and a connecting unit 140 connecting the display unit 120 and the main body unit 130.

The LCD 121 is a display device with a display screen for displaying text and images. Instead of an LCD, another type of thin display device such as an organic electroluminescence (organic EL) display may be employed.

The keyboard 131 is an input device that allows inputs of text and other operations.

The connecting unit 140 includes a switching shaft (not illustrated) for coupling the display unit 120 and main body unit 130 so that the display unit 120 is openable from and closable to the main body unit 130, and a pivot shaft (not illustrated) that crosses the switching shaft and couples the display unit 120 and the main body unit 130 so that they are rotatable relative to each other. These switching and pivot shafts of the connecting unit 140 enable the display unit 120 to be opened, closed, and rotated relative to the main body unit 130, so that the information processing apparatus 100 is switched among three states: the normal use state illustrated in FIG. 2, the tablet state illustrated in FIG. 3, and the unused state, not illustrated, in which the display unit 120 is closed with the LCD 121 facing inside.

This embodiment uses a convertible notebook personal computer as the information processing apparatus 100. Instead, a tablet notebook personal computer, which is made by integrally forming a display unit and a main body unit and is always used in a tablet state, may be employed. In addition, other types of notebook personal computers, and electronic devices other than notebook personal computers, which have a display function, such as mobile information terminal devices, may also be employed.

Figure 4:
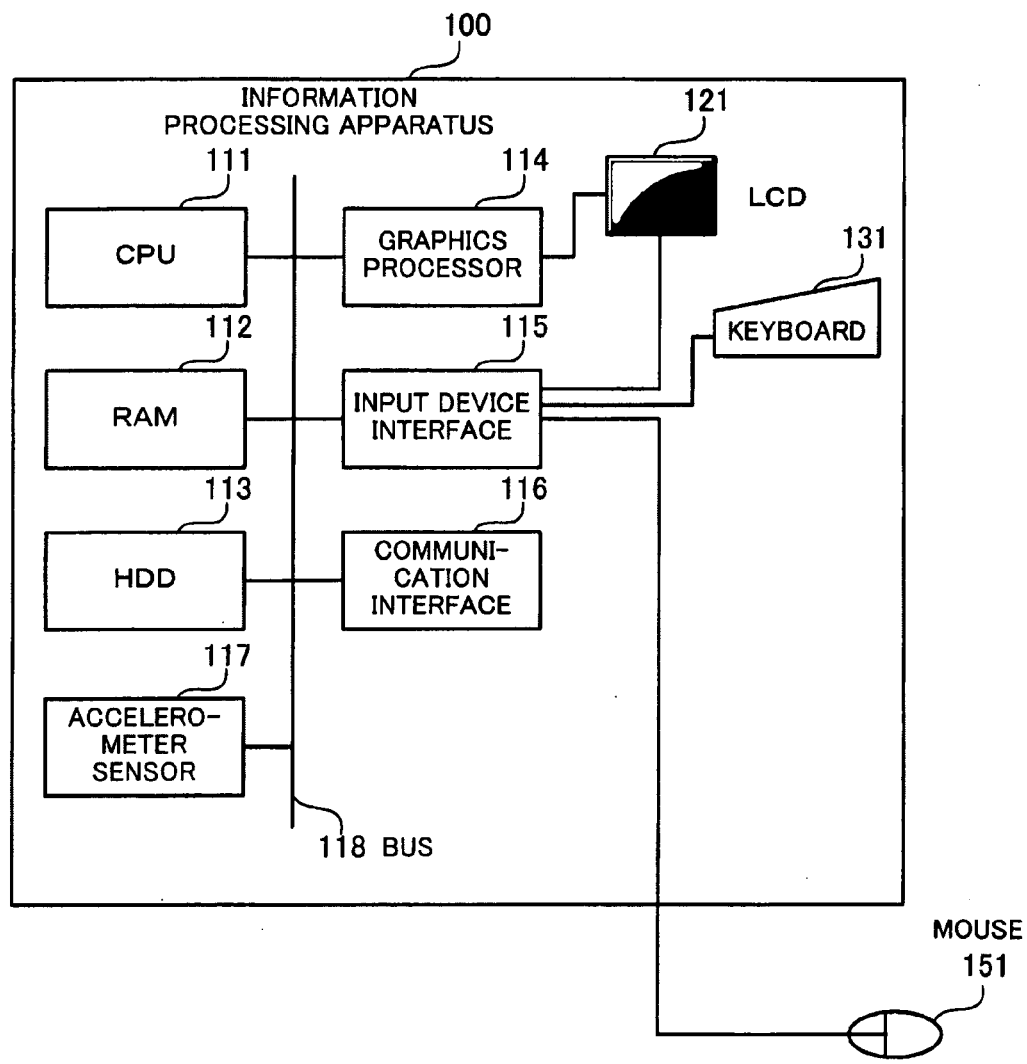
FIG. 4 illustrates a hardware configuration of the information processing apparatus according to the second embodiment.

FIG. 4 illustrates a hardware configuration of an information processing apparatus according to the second embodiment. The information processing apparatus 100 is entirely controlled by a central processing unit (CPU) 111. Connected to the CPU 111 via a bus 118 are a random access memory (RAM) 112 and a plurality of peripheral devices.

The RAM 112 is used as a main memory device of the information processing apparatus 100. This RAM 112 temporarily stores at least part of operating system (OS) program and application programs to be executed by the CPU 111. The RAM 112 also stores various kinds of data that the CPU 111 uses for its processing.

The peripheral devices connected to the bus 118 include a Hard Disk Drive (HDD) 113, a graphics processor 114, an input device interface 115, a communication interface 116, and an accelerometer sensor 117.

The HDD 113 stores data to be used by the OS and application programs of the information processing apparatus 100.

To the graphics processor 114, a display device such as an LCD 121 is connected. This graphics processor 114 is designed to display images on the display device such as the LCD 121 under the control of the CPU 111. In addition, the graphics processor 114 and the LCD 121 are connected to each other with a serial communication cable, and send and receive a control signal and an image signal alternately.

To the input device interface 115, input devices such as a built-in keyboard 131, the LCD 121, and an external mouse 151 are connected. The input device interface 115 transfers signals from these input devices including the keyboard 131 to the CPU 111 via the bus 118.

The communication interface 116 is connected to a network, not illustrated. This communication interface 116 is able to communicate data with other computers and communication devices via the network.

The accelerometer sensor 117 is provided in a display unit 120 for detecting a tilt direction of the LCD 121 with respect to the vertical downward direction. This accelerometer sensor 117 detects the tilt direction of the LCD 121 on the basis of the gravitational acceleration applied to the information processing apparatus 100. Then, the accelerometer sensor 117 outputs data indicating the detected tilt direction to the CPU 111. As the accelerometer sensor 117, a dual-axis sensor may be employed, which is able to detect tilts around two axes: x-axis (for example, an axis extending in the top-bottom direction of the LCD 121) and y-axis (for example, an axis extending in the left-right direction of the LCD 121) of a plane surface parallel to a display screen 121a of the LCD 121 of the display unit 120. The accelerometer sensor 117 detects the tilt direction of the LCD 121 with respect to the vertical downward direction by combining tilts around x- and y-axes.

Data indicating a tilt direction, which is output from the accelerometer sensor 117, may be an absolute value (for example, an angle between the projection of the vertical downward direction onto the plane surface of the display screen 121a and the downward direction of the plane surface of the display screen 121a), or represent an amount of an instant tilt change.

The LCD 121 is able to display the display screen 121a in four directions, "upright", "upside down", "rotated left", and "rotated right", according to movements of the information processing apparatus 100. In addition, the LCD 121 detects a contact of a touch pen to the display surface provided in the front surface thereof by detecting a change in pressure or static electricity on the display surface, so as to receive user inputs such as input of text and selection of an icon displayed on the display surface. Again, the LCD 121 according to this embodiment is able to display the display screen 121a in four directions. Instead, it may be so designed that the display screen 121a is displayed in three or less directions, or five or more directions (for example, eight directions of "upright", "upside down", "rotated left", "rotated right", "inclined leftward", "inclined rightward", "upside-down inclined leftward", and "upside-down inclined rightward", or any directions which are set continuously).

In order to change the display orientation of the display screen 121a, the information processing apparatus 100 may be provided with a screen rotation button for receiving an operation instruction for rotating the display screen 121a. In addition, instead of providing such a screen rotation button, the information processing apparatus 100 may receive an operation instruction to change the display orientation of the display screen 121a, for example, by receiving an input directly representing a desired display orientation via a cross key, or by receiving an input of the desired display orientation via the mouse 151 on an especially prepared display orientation input window, not illustrated.

With the above-described hardware configuration, the processing functions of this embodiment are realized.

Figure 5:
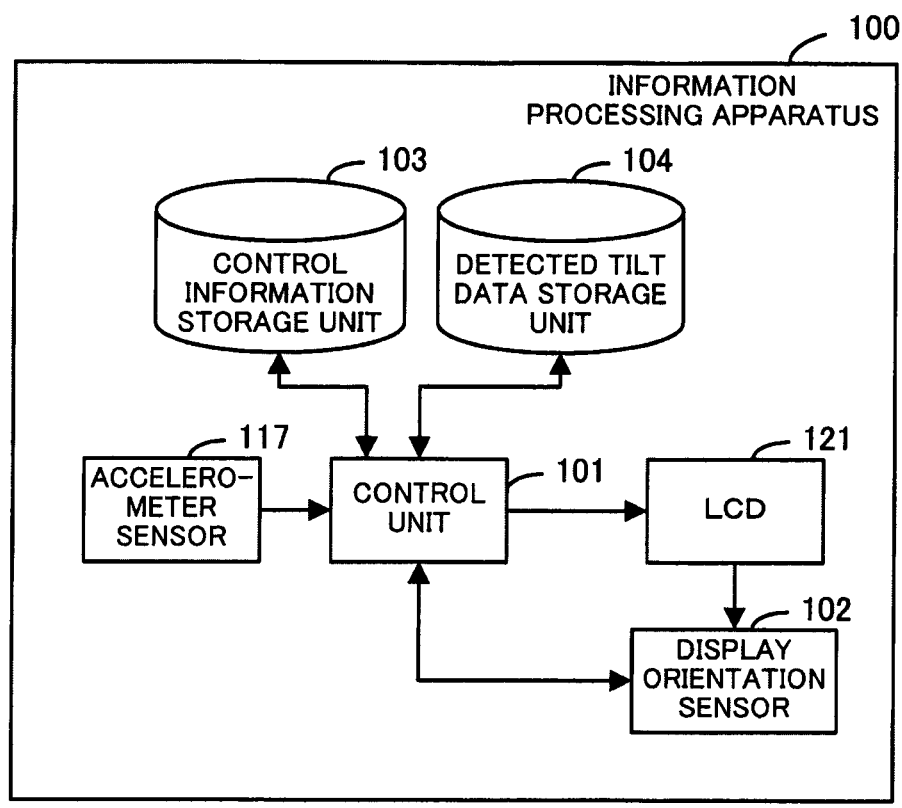
FIG. 5 is a block diagram of the information processing apparatus according to the second embodiment.

FIG. 5 is a block diagram of an information processing apparatus according to the second embodiment. The illustrated information processing apparatus 100 is provided with a function of displaying images. This information processing apparatus 100 includes a control unit 101, a display orientation sensor 102, a control information storage unit 103, a detected tilt data storage unit 104, an accelerometer sensor 117, and an LCD 121.

The control unit 101 analyzes detected tilt data stored in the detected tilt data storage unit 104 to capture the state of changes of tilt angles detected by the accelerometer sensor 117. If the detected tilt data stored in the detected tilt data storage unit 104 indicates that the changes in tilt angle crossed a threshold, the control unit 101 determines that the changes in tilt direction and tilt angle are large. If the detected tilt data stored in the detected tilt data storage unit 104 indicates that the changes in tilt angle continued around but not across a threshold and then crossed the threshold, the control unit 101 determines that the changes in tilt direction and tilt angle are small.

Then, the control unit 101 modifies thresholds of control information stored in the control information storage unit 103, depending on the state of the changes in tilt angle. More specifically, if the changes in tilt angle are small, the control unit 101 modifies the thresholds of the control information stored in the control information storage unit 103 so that a small change in tilt angle causes a change of the display orientation of a display screen. If the changes in tilt angle are large, the control unit 101 modifies the thresholds of the control information stored in the control information storage unit 103 so that a large change in tilt angle causes a change of the display orientation of the display screen.

After that, the control unit 101 changes the display orientation of the display screen on the basis of the modified control information and a detected tilt direction and tilt angle. With this approach, it becomes possible to adjust an auto-rotation of the display orientation of the display screen depending on whether changes in tilt of the information processing apparatus 100 are large or small.

The display orientation sensor 102 detects a display orientation of the display screen displayed on the LCD 121. To this end, for example, the control unit 101 may notify the display orientation sensor 102 of the display orientation of the LCD 121 on the basis of control exercised on the display orientation of the display screen each time the display orientation is changed, automatically by the control unit 101 or by a user or an application.

The control information storage unit 103 stores control information that indicates correlations between display orientations of the display screen of the LCD 121 and tilts of the LCD 121 to be detected by the accelerometer sensor 117. On the basis of the correlations indicated by the control information, the information processing apparatus 100 changes the display orientation of the display screen. In addition, the control information indicates thresholds of a tilt direction and tilt angle to be detected by the accelerometer sensor 117, for determining whether to change the display orientation of the display screen.

The detected tilt data storage unit 104 stores detected tilt data that indicates a history of tilt directions and tilt angles detected by the accelerometer sensor 117. The detected tilt data indicates changes of tilt directions and tilt angles detected at a predetermined number of past time points. On the basis of the past tilt directions and tilt angles of the information processing apparatus 100, indicated by the detected tilt data, it is determined whether changes in tilt angle of the information processing apparatus 100 are large or small.

The accelerometer sensor 117 detects a tilt direction and tilt angle of the LCD 121 of the information processing apparatus 100 with respect to the vertical downward direction. In this embodiment, the accelerometer sensor 117 detects the tilt of the LCD 121 as the tilt of the information processing apparatus 100 in order to control the display orientation of the display screen. The accelerometer sensor 117 detects the tilt direction of the LCD 121 by detecting the direction of gravity on the basis of acceleration applied to the accelerometer sensor 117. In this connection, instead of detecting acceleration, a gyro sensor or the like may be employed in the information processing apparatus 100 to detect the direction of operation, thereby detecting the tilt direction of the LCD 121.

The LCD 121 has the display screen for displaying information, and is able to change the display orientation of the display screen in four directions: "upright", "upside down", "rotated left", and "rotated right". Instead, the LCD 121 may be designed to change the display orientation of the display screen in three or less directions or five or more directions. Furthermore, the LCD 121 may be designed to change the display orientation of the display screen in any desired directions. In addition, the LCD 121 is able to display graphic information such as motion pictures and still pictures, as well as text information, on the display screen.

FIG. 6 illustrates a control table according to the second embodiment. The illustrated control table 103a is created and managed by the control unit 101, and is stored in the HDD 113 serving as the control information storage unit 103. The control table 103a is a table that stores control information which indicates correlations between display orientations of the display screen 121a and tilts of the information processing apparatus 100, and is used in controlling the display orientation of the display screen 121a.

The control table 103a has fields for "Rotation Angle", "Angle Range Around X-axis", and "Angle Range Around Y-axis." Data in fields arranged in a horizontal direction is associated with each other to compose one piece of control information. In this description, as will be described in detail later with reference to FIG. 8, a direction extending from a user horizontally facing the LCD 121 of the information processing apparatus 100 toward the LCD 121 is defined as an x-axis direction, and a rotation around the x-axis is defined as an x-axis rotation. In addition, a lateral direction of the LCD 121 of the information processing apparatus 100, which is perpendicular to the x-axis, is defined as a y-axis direction, and a rotation around the y-axis is defined as a y-axis rotation.

A rotation angle is an angle that specifies the display orientation of the display screen 121a. Preset rotation angles are "0 degree", "+90 degrees", "+180 degrees", and "−90 degrees (+270 degrees)". The rotation angle of "0 degree" means that the display screen 121a has a display orientation in which the vertical downward direction matches the downward direction of the display screen 121a, as viewed by the user horizontally facing the LCD 121. The rotation angle of "+90 degrees" means that the display screen 121a has a display orientation in which the downward direction of the display screen 121a, which matches the vertical downward direction, is rotated clockwise by 90 degrees, as viewed by the user horizontally facing the LCD 121, i.e., the display screen 121a is rotated clockwise by 90 degrees with respect to the LCD 121. The rotation angle of "+180 degrees" means that the display screen 121a has a display orientation in which the downward direction of the display screen 121a, which matches the vertical downward direction, is rotated clockwise by 180 degrees, as viewed from the user horizontally facing the LCD 121, i.e., the upward direction of the display screen 121a matches the downward direction of the LCD 121.

The rotation angle of "−90 degrees" means that the display screen 121a has a display orientation in which the downward direction of the display screen 121a, which matches the vertical downward direction, is rotated clockwise by 270 degrees, as viewed from the user horizontally facing the LCD 121, i.e., the display screen 121a is rotated counterclockwise by 90 degrees with respect to the LCD 121.

Each of the angle range around x-axis and the angle range around y-axis indicates a threshold corresponding to a rotation angle. More specifically, if an angle around x-axis falls in a range from −10 to +10 degrees and an angle around y-axis falls in a range from −40 to +90 degrees, the rotation angle of 0 degree applies. If an angle around x-axis falls in a range from −90 to −11 degrees and an angle around y-axis falls in a range from −40 to +90 degrees, the rotation angle of +90 degrees applies. If an angle around x-axis is −91 degrees or less or +91 degrees or greater or an angle around y-axis is −41 degrees or less or +91 degrees or greater, the rotation angle of +180 degrees applies. If an angle around x-axis falls in a range from +11 to +90 degrees and an angle around y-axis falls in a range from −40 to +90 degrees, the rotation angle of −90 degrees applies.

In short, the information processing apparatus 100 displays the display screen 121a in a display orientation of a rotation angle corresponding to a combination of an angle range around x-axis and angle range around y-axis in which a detected tilt of the information processing apparatus 100 falls.

This embodiment employs the rotation angles of "0 degree", "+90 degrees", "+180 degrees", and "−90 degrees". Alternatively, any desired angles (for example, angles separated by 45 degrees) may be employed.

FIG. 7 illustrates a detected tilt table according to the second embodiment. The illustrated detected tilt table 104a is created and managed by the control unit 101, and is stored in the HDD 113 serving as the detected tilt data storage unit 104. The detected tilt table 104a is a table that stores detected tilt data indicating a history of tilts of the information processing apparatus 100 detected by the accelerometer sensor 117.

The detected tilt table 104a contains the tilts of the information processing apparatus 100 detected by the accelerometer sensor 117 in reverse chronological order, newest first. The accelerometer sensor 117 detects the tilt of the information processing apparatus 100 at predetermined intervals (for example, every 0.1 second). The control unit 101 stores detected tilt data indicating the tilt detected by the accelerometer sensor 117 in the detected tilt table 104a.

The detected tilt table 104a has fields for "Number (No.)", "Angle Around X-axis", and "Angle Around Y-axis". The "Number" field indicates the order of a detected tilt of the information processing apparatus 100 in reverse chronological order. The "Angle Around X-axis" field contains a detected tilt angle around x-axis of the information processing apparatus 100. The "Angle Around Y-axis" field contains a detected tilt angle around y-axis of the information processing apparatus 100. Data in fields arranged in a horizontal direction is associated with each other to compose one piece of detected tilt data.

As numbers, increasing sequence numbers are assigned to the tilts of the information processing apparatus 100 detected by the accelerometer sensor 117 in reverse chronological order, so that the detected tilt data is listed in reverse chronological order.

The detected tilt angle around x-axis is a tilt angle around x-axis of the information processing apparatus 100 detected by the accelerometer sensor 117. The detected tilt angle around y-axis is a tilt angle around y-axis of the information processing apparatus 100 detected by the accelerometer sensor 117.

The detected tilt table 104a stores 30 pieces of latest detected tilt data. When the accelerometer sensor 117 detects a new tilt of the information processing apparatus 100, and stores this new detected tilt data in the detected tilt table 104a, the oldest detected tilt data having the largest number is deleted, and increasing sequence numbers are reassigned to the remaining and new detected tilt data in reverse chronological order.

FIGS. 8A to 10 illustrate correlations between orientations of an information processing apparatus and display orientations of a display screen according to the second embodiment. Changes of the orientation of the information processing apparatus 100 and the display orientation of the display screen 121a will be described with reference to FIGS. 8A to 10.

In FIGS. 8A to 10, a direction indicated by an arrow A is defined as a rightward direction, whereas a direction indicated by an arrow B is defined as a vertical downward direction.

While used in a normal use state or tablet state, the information processing apparatus 100 changes the display orientation of the display screen 121a according to the orientation of the information processing apparatus 100 detected by the accelerometer sensor 117. This allows a user to use the LCD 121 in the vertical direction or horizontal direction. While FIGS. 8A to 10 illustrate the information processing apparatus 100 in tablet state by way of example, the same applies for the information processing apparatus 100 in normal use state. In addition, this embodiment defines a surface on which the LCD 121 is provided, as a front surface 100a, and also a side surface of the information processing apparatus 100 which exists in the vertical downward direction, as viewed by the user horizontally facing the LCD 121 of the information processing apparatus 100, as a bottom surface 100b of the information processing apparatus 100. In addition, a side surface of the information processing apparatus 100 which exists in the vertical upward direction, as viewed by the user horizontally facing the LCD 121 of the information processing apparatus 100, is defined as a top surface 100c of the information processing apparatus 100. A front direction of the LCD 121 of the information processing apparatus 100 is defined as an x-axis direction, and a rotation around the x-axis is defined as an x-axis rotation. A lateral direction of the LCD 121 of the information processing apparatus 100 is defined as a y-axis direction, and a rotation around the y-axis is defined as a y-axis rotation.

Figure 8A:
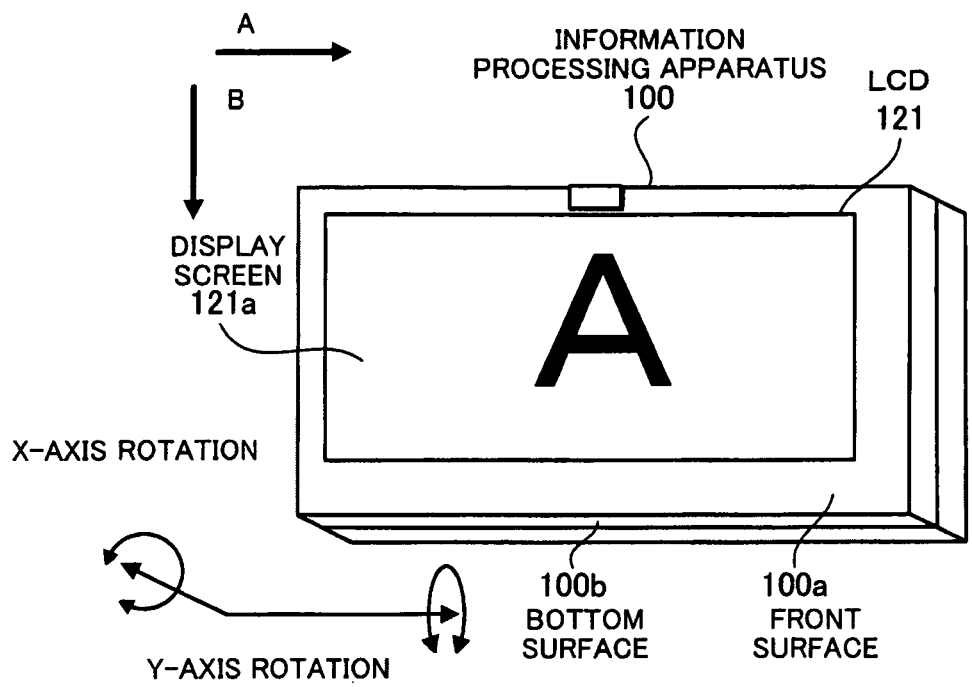
FIGS. 8A, 8B, 9A, 9B, and 10 illustrate correlations between orientations of the information processing apparatus and display orientations of the display screen according to the second embodiment.

FIG. 8A illustrates the information processing apparatus 100 which has an orientation in which the downward direction of the LCD 121 matches the projection direction of the vertical downward direction indicated by the arrow B onto the LCD 121. The display screen 121a displaying a letter of "A" has a display orientation in which the downward direction of the display screen 121a matches the downward direction of the LCD 121. At this time, it is assumed that a pause mode is off in the information processing apparatus 100.

Figure 8B:
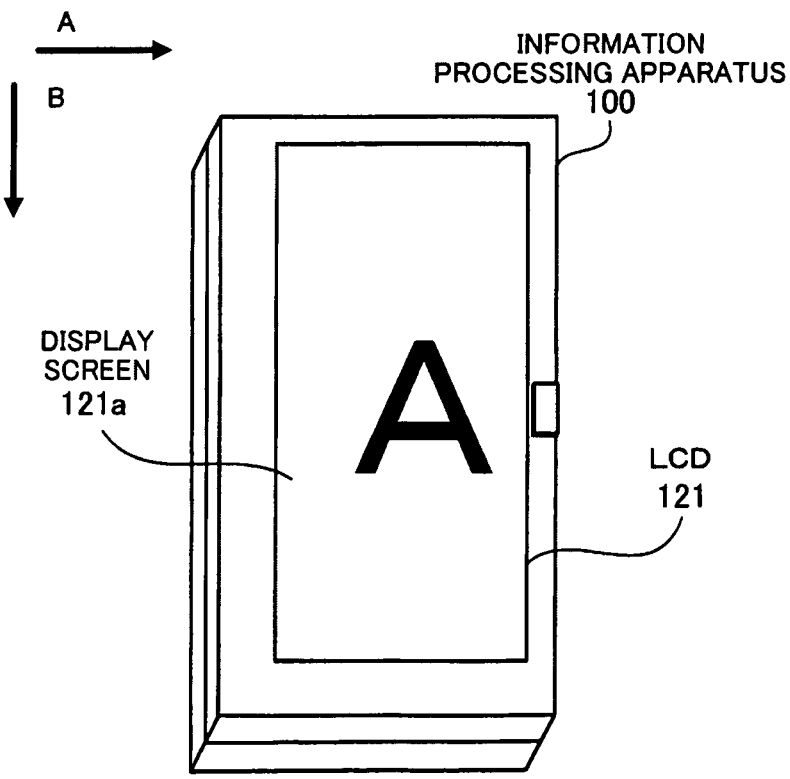

FIG. 8B illustrates the information processing apparatus 100 rotated by −90 degrees around the x-axis from the orientation illustrated in the FIG. 8A. That is, the downward direction of the LCD 121 is rotated clockwise by 90 degrees with respect to the projection direction of the vertical downward direction indicated by the arrow B onto the LCD 121. At this time, the information processing apparatus 100 automatically rotates the display orientation of the display screen 121a counterclockwise by 90 degrees with respect to the downward direction of the LCD 121, from the display orientation illustrated in FIG. 8A. As a result, when the information processing apparatus 100 is rotated clockwise around the x-axis, a user is able to view the display screen 121a without regard to the rotation of the information processing apparatus 100.

Figure 9A:
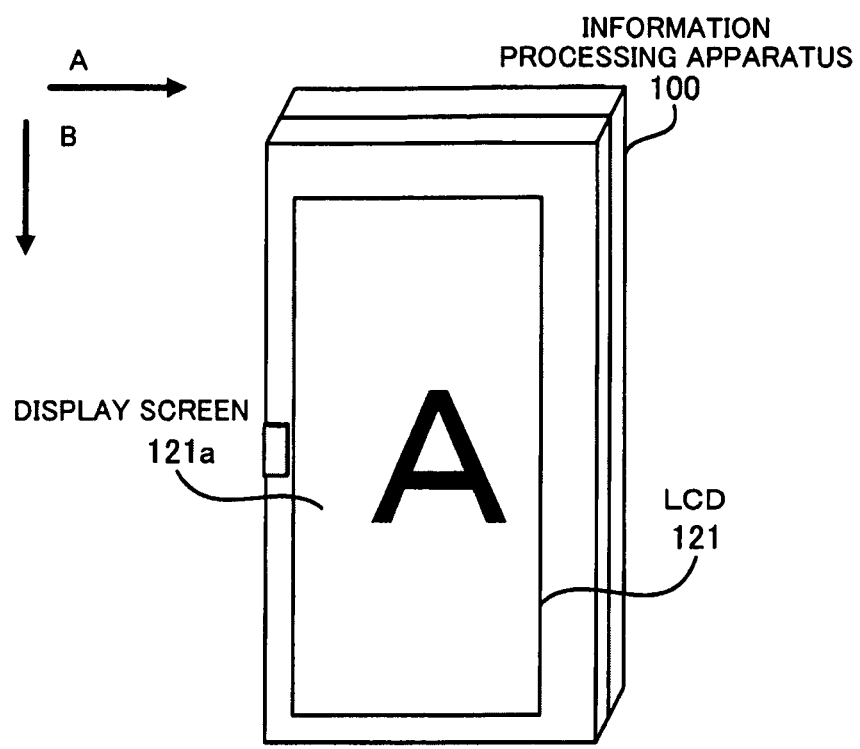

FIG. 9A illustrates the information processing apparatus 100 rotated by +90 degrees around the x-axis from the orientation illustrated in FIG. 8A. That is, the downward direction of the LCD 121 is rotated counterclockwise by 90 degrees with respect to the projection direction of the vertical downward direction indicated by the arrow B onto the LCD 121. At this time, the information processing apparatus 100 automatically rotates the display orientation of the display screen 121a clockwise by 90 degrees with respect to the downward direction of the LCD 121, from the display orientation illustrated in FIG. 8A. As a result, when the information processing apparatus 100 is rotated counterclockwise around the x-axis, the user is able to view the display screen 121a without regard to the rotation of the information processing apparatus 100.

Figure 9B:
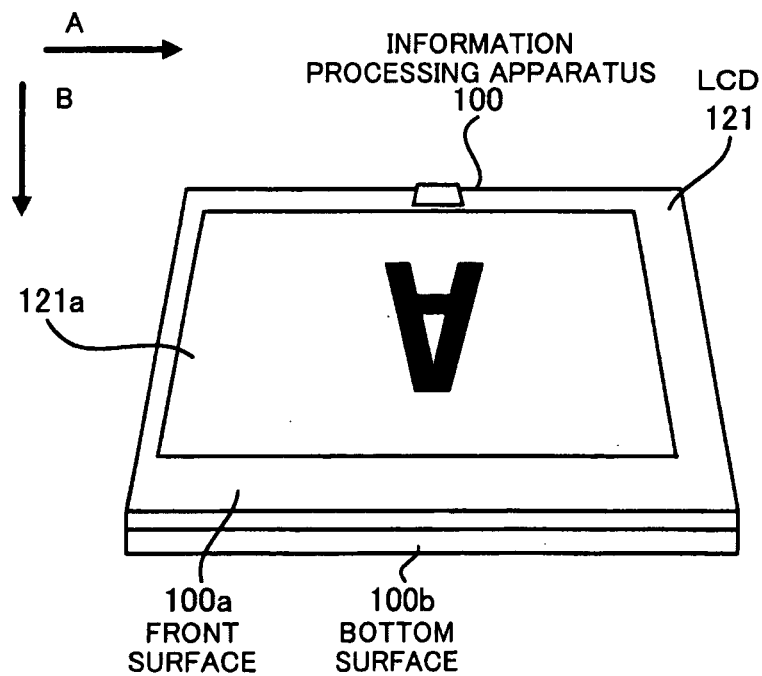

FIG. 9B illustrates the information processing apparatus 100 rotated by −45 degrees around the y-axis from the orientation illustrated in FIG. 8A. That is, the LCD 121 is tilted away from the user. At this time, the information processing apparatus 100 automatically rotates the display orientation of the display screen 121a clockwise by 180 degrees with respect to the downward direction of the LCD 121, from the display orientation illustrated in FIG. 8A. When the information processing apparatus 100 is rotated around the y-axis so as to tilt the LCD 121 away from the user, i.e., for example, so as to tilt the LCD 121 backwards to show the display screen 121a to another person who is in front of the user, the display screen 121a is displayed with its display orientation rotated by 180 degrees.

Figure 10:
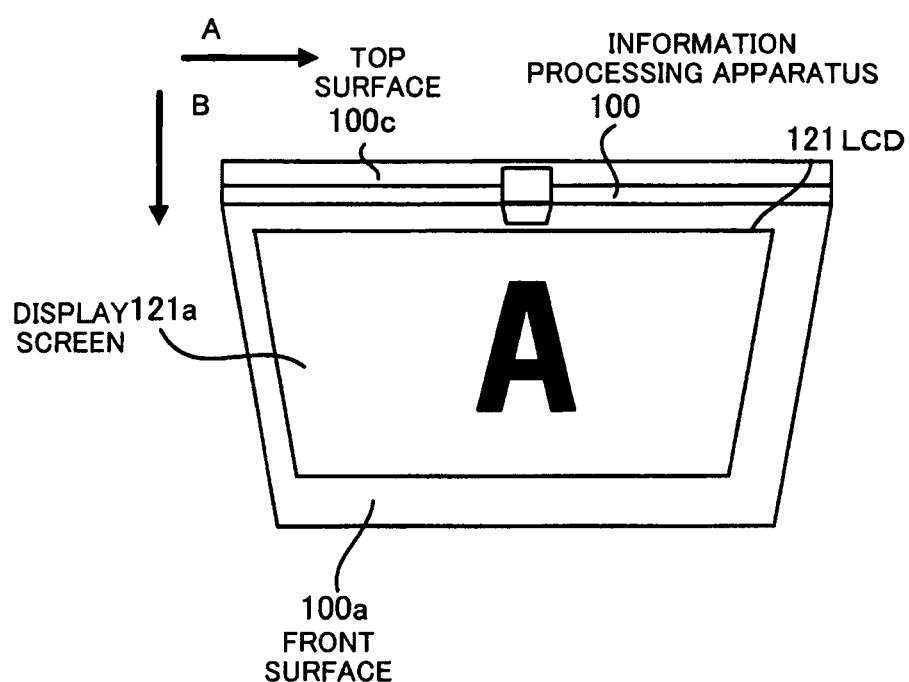

FIG. 10 illustrates the information processing apparatus 100 rotated by +45 degrees around the y-axis from the orientation illustrated in FIG. 8A. That is, the LCD 121 is tilted toward the user. At this time, in this information processing apparatus 100, because of the auto-rotation of the display orientation, the display screen 121a has such a display orientation that its downward direction matches the downward direction of the LCD 121 as in the display orientation of FIG. 8A. As a result, when the information processing apparatus 100 is rotated around the y-axis so as to tilt the LCD 121 toward the user, he/she is able to view the display screen 121a in the normal display orientation:

FIGS. 8A to 10 describe the cases of making only an x-axis rotation or only a y-axis rotation. However, the same explanation applies for a tilt made by combined x-axis and y-axis rotations.

Figure 11:
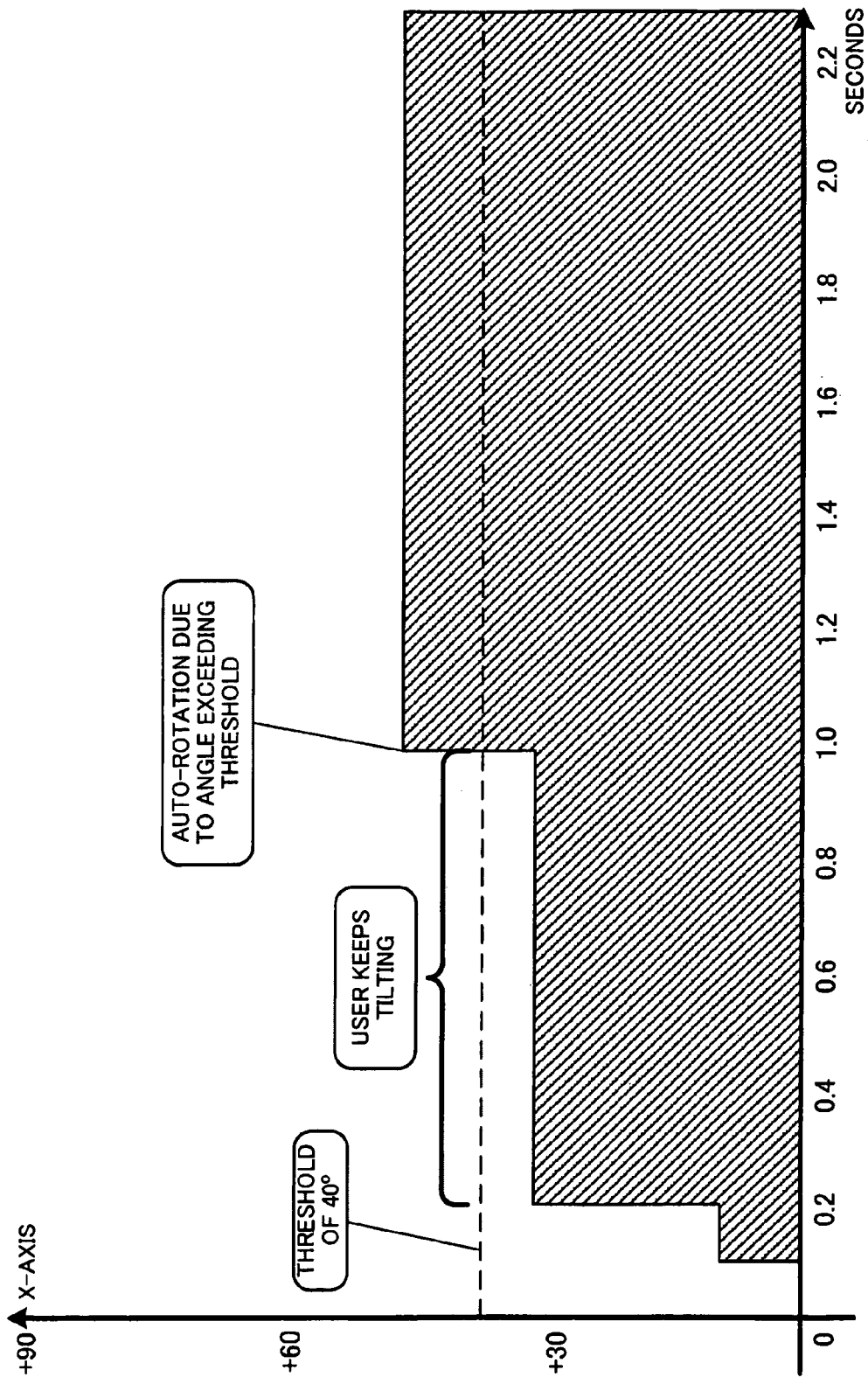
FIG. 11 illustrates a first example of changes in angle of the information processing apparatus according to the second embodiment.

FIG. 11 illustrates a first example of changes in angle of an information processing apparatus according to the second embodiment. In FIG. 11, a vertical axis indicates a tilt around x-axis of the information processing apparatus 100, whereas a horizontal axis indicates a time during which the tilt is applied.

Assume now that the user tilts the information processing apparatus 100 clockwise around the x-axis so as to display the display screen 121a in a display orientation rotated counter-clockwise by 90 degrees (a rotation angle of −90 degrees), as illustrated in FIG. 8B, but the tilt angle made by the user is lower than a threshold, which results in not causing the auto-rotation of the display orientation of the display screen 121a. In this case, the user would tilt the information processing apparatus 100 more so as to cause the desired auto-rotation. FIG. 11 illustrates the tilt of the information processing apparatus 100 for this situation. It is assumed that, for simple explanation, the user makes only an x-axis rotation by tilting the information processing apparatus 100, and makes no y-axis rotation.

Referring to FIG. 11, it is assumed that control information indicates a threshold of 40 degrees for automatically rotating the display orientation of the display screen 121a counter-clockwise by 90 degrees. Therefore, to cause the user's desired auto-rotation, a tilt angle around x-axis needs to increase beyond the threshold of 40 degrees.

Assume that the user tilts the information processing apparatus 100 to such an extent that "this tilt will exceed a threshold for the desired auto-rotation", and keeps this tilt from the 0.2 second point to the 1.0 second point of FIG. 11. However, the actual tilt angle around x-axis of the information processing apparatus 100 is 35 degrees. The tilt angle is still lower than the threshold of 40 degrees, which results in not causing the user's desired auto-rotation.

Then, the user tilts the information processing apparatus 100 more at the 1.0 second point of FIG. 11, assuming that "the tilt of the information processing apparatus 100 is not sufficient". Thereby, the tilt angle around x-axis of the information processing apparatus 100 becomes 50 degrees, which exceeds the threshold of 40 degrees. As a result, the user's desired auto-rotation is caused, allowing the display screen 121a to be displayed in a display orientation with a rotation angle of −90 degrees.

According to this embodiment, if an auto-rotation is not caused by a tilt angle that the user expects to cause an auto-rotation of the display screen 121a because a user's expected threshold and actual threshold for the auto-rotation have some gap, as described above with reference to FIG. 11, this gap is reduced by modifying thresholds of the control information, as described below, thereby allowing a user's expected tilt angle to cause the auto-rotation.

Figure 12:
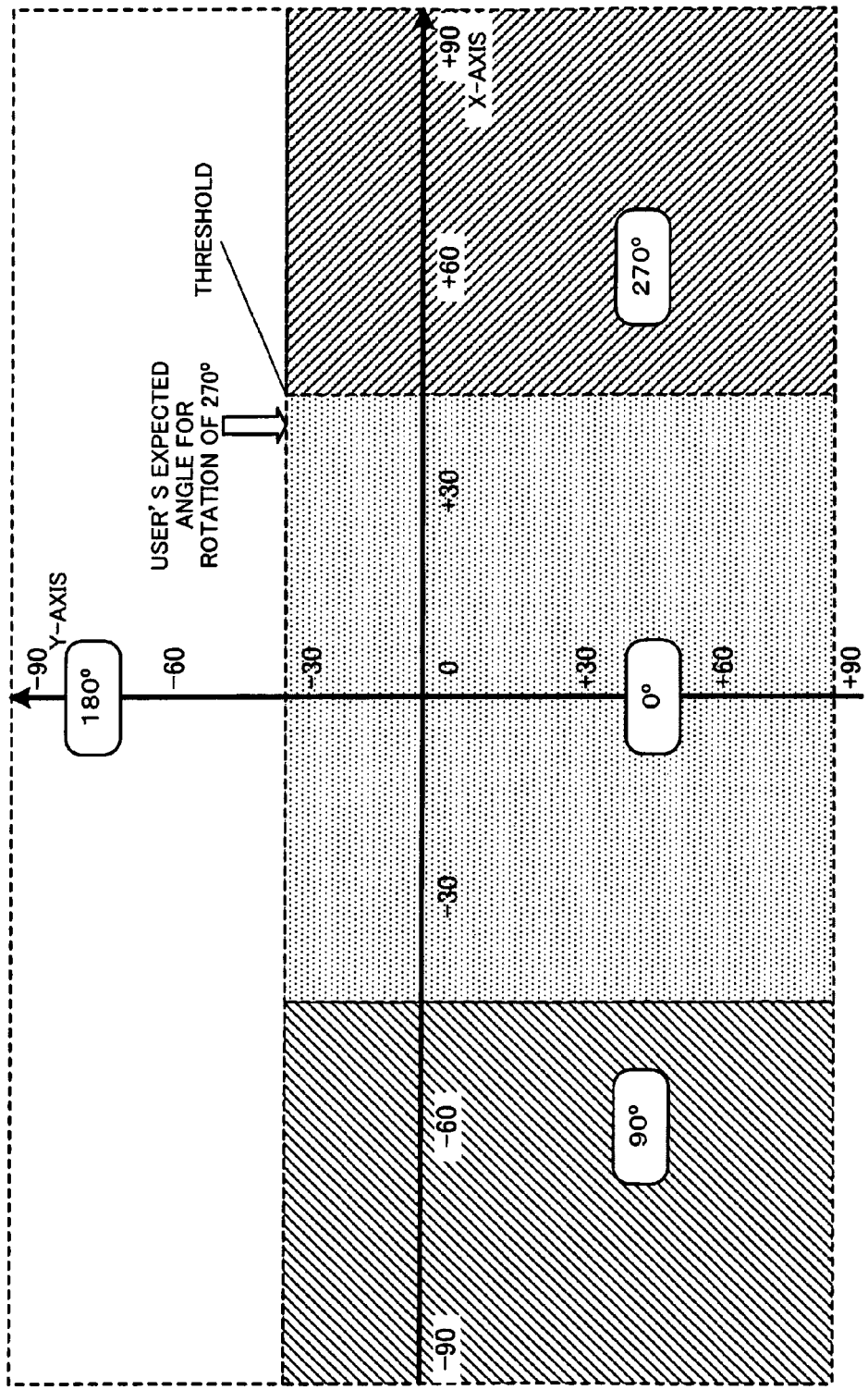
FIGS. 12 and 13 illustrate how to modify thresholds of control information in the first example of changes in angle of the information processing apparatus according to the second embodiment.
Figure 13:
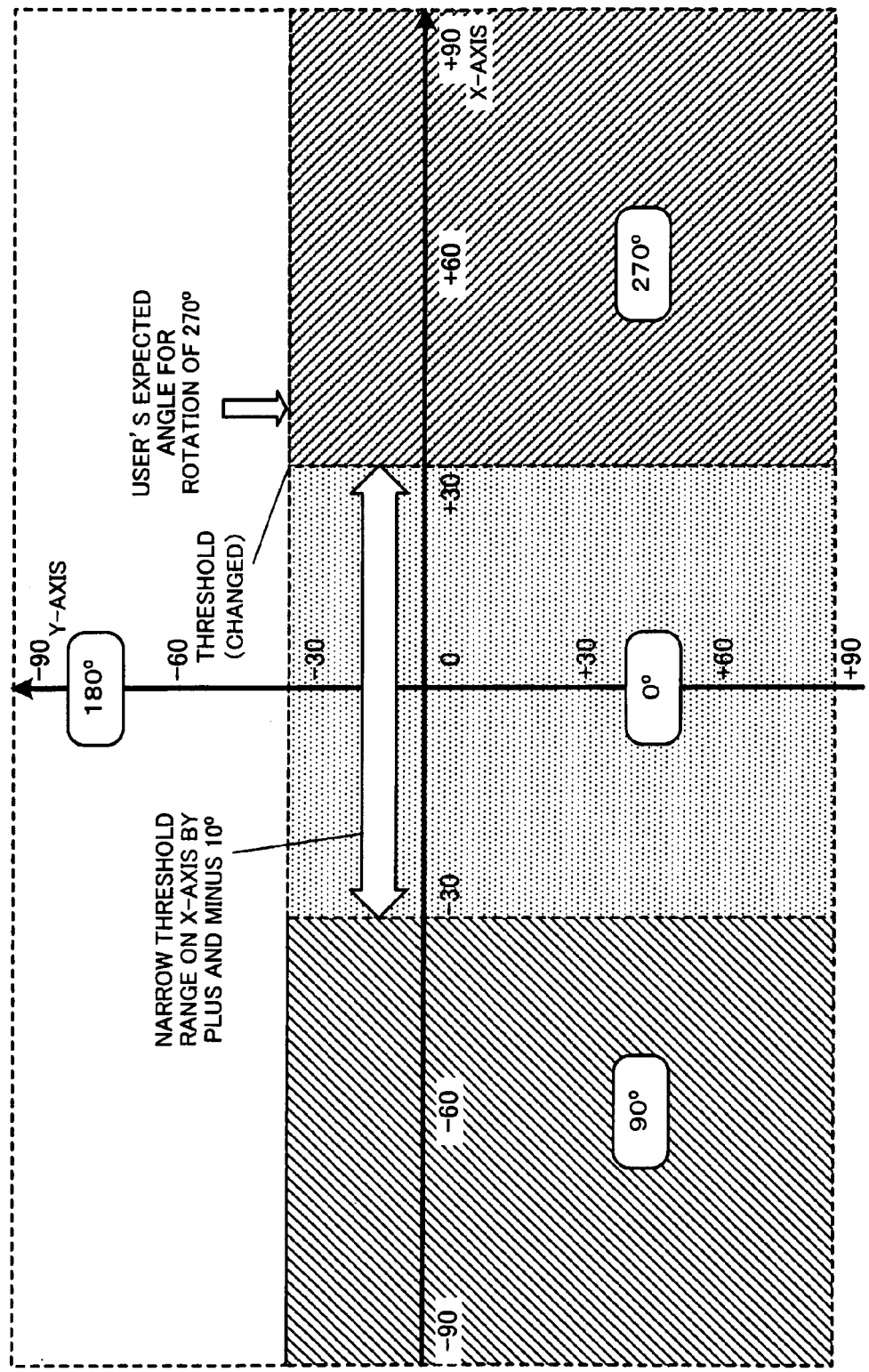

FIGS. 12 and 13 illustrate how to modify thresholds of control information in the first example of changes in angle of the information processing apparatus according to the second embodiment. In FIGS. 12 and 13, a vertical axis represents a y-axis rotation of the information processing apparatus 100, whereas a horizontal axis represents an x-axis rotation of the information processing apparatus 100.

Referring to FIG. 12, as a threshold for the display screen 121a to have a display orientation with a rotation angle of 0 degree, a tilt angle around x-axis ranges from −40 to +40 degrees, and a tilt angle around y-axis ranges from −40 to +90 degrees. As a threshold for the display screen 121a to have a display orientation with a rotation angle of +90 degrees, a tilt angle around x-axis ranges from −90 to −41 degrees, and a tilt angle around y-axis ranges from −40 to +90 degrees. As a threshold for the display screen 121a to have a display orientation with a rotation angle of +180 degrees, a tilt angle around x-axis is −91 degrees or lower or +91 degrees or greater, or a tilt angle around y-axis is −41 degrees or lower or +91 degrees or greater. As a threshold for the display screen 121a to have a display orientation with a rotation angle of −90 degrees, a tilt angle around x-axis ranges from +41 to +90 degrees, and a tilt angle around y-axis ranges from −40 to +90 degrees.

According to this embodiment, if the auto-rotation is not caused by a user's expected angle, the tilt angle around x-axis set as the threshold for the display screen 121a to have a display orientation with a rotation angle of 0 degree is modified to range from −30 to +30 degrees by making the positive and negative threshold values of the tilt angle around x-axis closer to the origin by 10 degrees, as illustrated in FIG. 13, which will be described later with reference to FIGS. 17 and 18. This allows the auto-rotation of the display orientation of the display screen 121a to be easily caused, so that a user's expected threshold for the auto-rotation become closer to an actual threshold for the auto-rotation of the information processing apparatus 100. As a result, the user is able to cause the auto-rotation by the user's expected angle.

Figure 14:
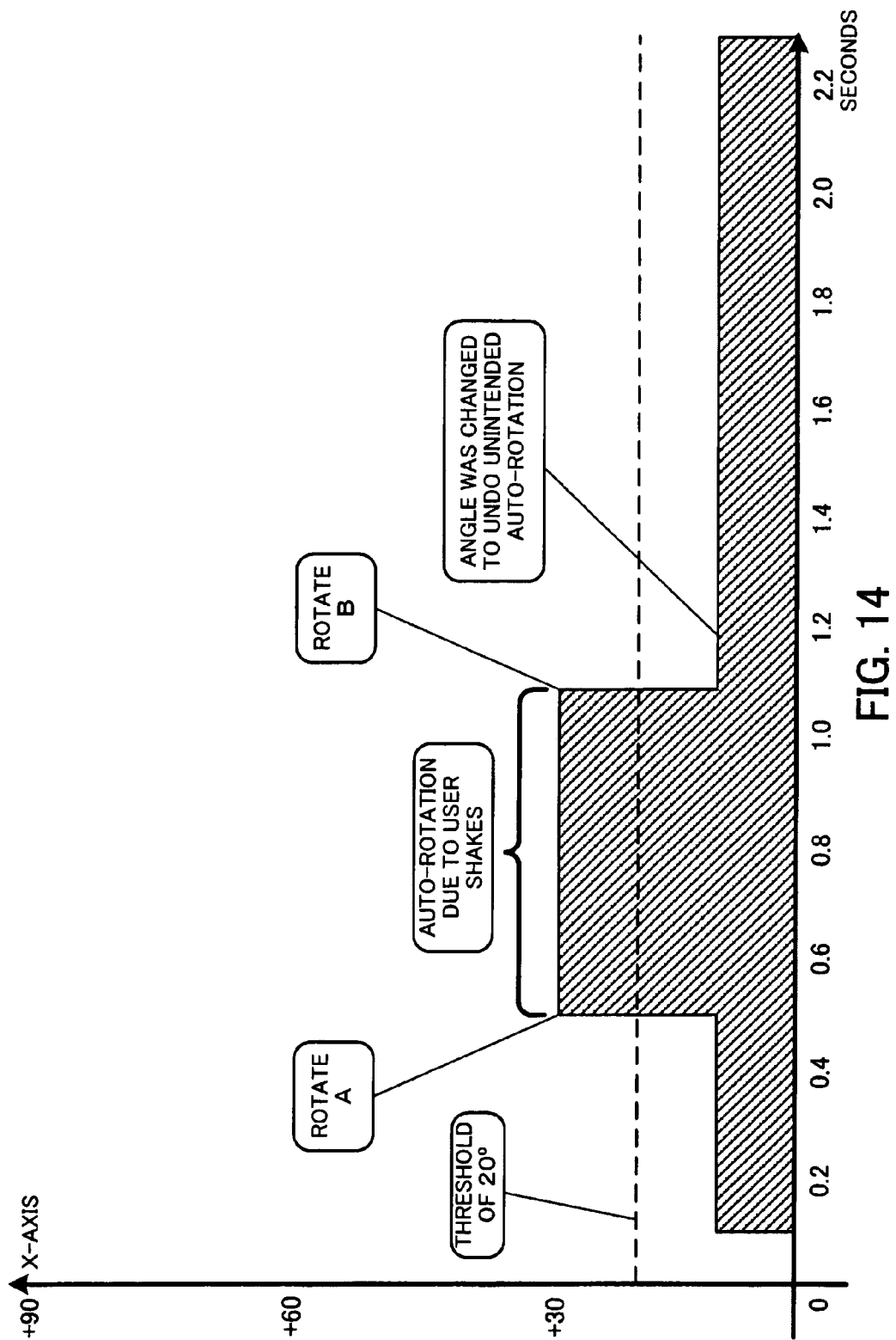
FIG. 14 illustrates a second example of changes in angle of the information processing apparatus according to the second embodiment.

FIG. 14 illustrates a second example of changes in angle of the information processing apparatus according to the second embodiment. In FIG. 14, a vertical axis represents a tilt around x-axis of the information processing apparatus 100, whereas a horizontal axis represents a time during which the tilt is applied.

Assume now that the display orientation of the display screen 121a is automatically rotated against user's intention. In this case, the user would tilt the information processing apparatus 100 back so as to make an automatic reverse rotation to undo the unintended rotation. FIG. 14 illustrates the tilt of the information processing apparatus 100 for this situation. It is assumed that, for simple explanation, the user makes only an x-axis rotation by tilting the information processing apparatus 100, and makes no y-axis rotation.

Referring to FIG. 14, it is assumed that control information indicates a threshold of 20 degrees for automatically rotating the display orientation of the display screen 121a counter-clockwise by 90 degrees. At the 0.5 second point, a tilt angle around x-axis exceeds the threshold of 20 degrees, and an unintended auto-rotation is caused. In order to make an automatic reverse rotation to undo the unintended rotation, the tilt angle around x-axis needs to decrease to the threshold of 20 degrees or lower.

Referring to FIG. 14, from the 0.5 second point to the 1.1 second point, the tilt angle around x-axis of the information processing apparatus 100 is 30 degrees, greater than the threshold of 20 degrees, due to user shakes, which causes the unintended auto-rotation. Thereby, the display screen 121a has a display orientation with a rotation angle of −90 degrees. Then, at the 1.1 second point, the user tilts the information processing apparatus 100 to such an extent that "the tilt will exceed the threshold for an automatic reverse rotation to undo the unintended auto-rotation". Then, the user keeps this tilt. As the tilt angle decreases to the threshold of 20 degrees or lower, the automatic reverse rotation is caused, and the display screen 121a has a display orientation with a rotation angle of 0 degree, as the user desires.

According to this embodiment, if the tilt angle of the information processing apparatus 100 often changes above and below a threshold for an auto-rotation of the display orientation of the display screen 121a and thereby the auto-rotation occurs too frequently, as described with reference to FIG. 14, the conditions for occurrence of the auto-rotation are made stricter by modifying thresholds of the control information as described below, thereby making it possible to cause the auto-rotation as frequently as the user desires.

Figure 15:
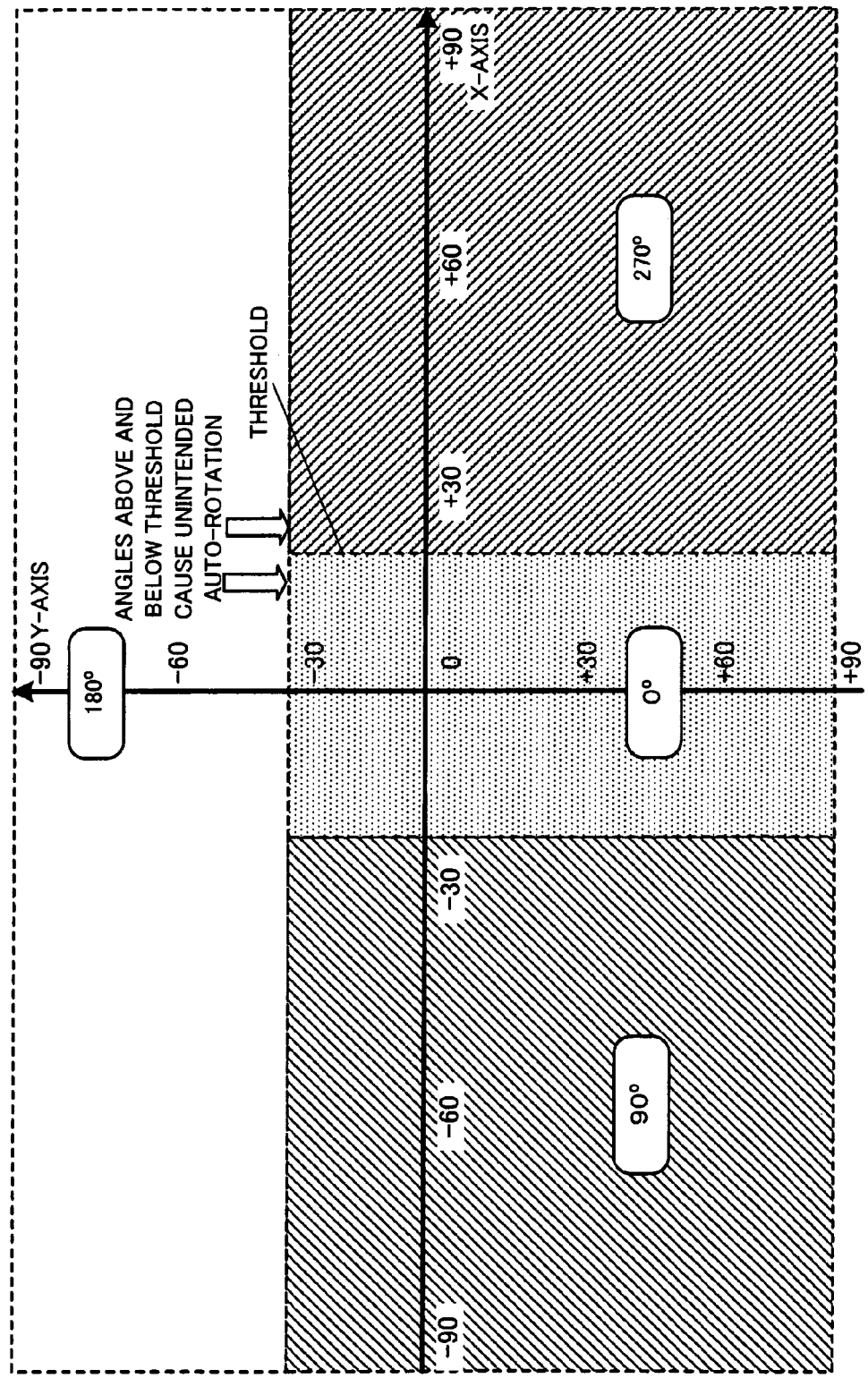
FIGS. 15 and 16 illustrate how to modify thresholds of control information in the second example of changes in angle of the information processing apparatus according to the second embodiment.
Figure 16:
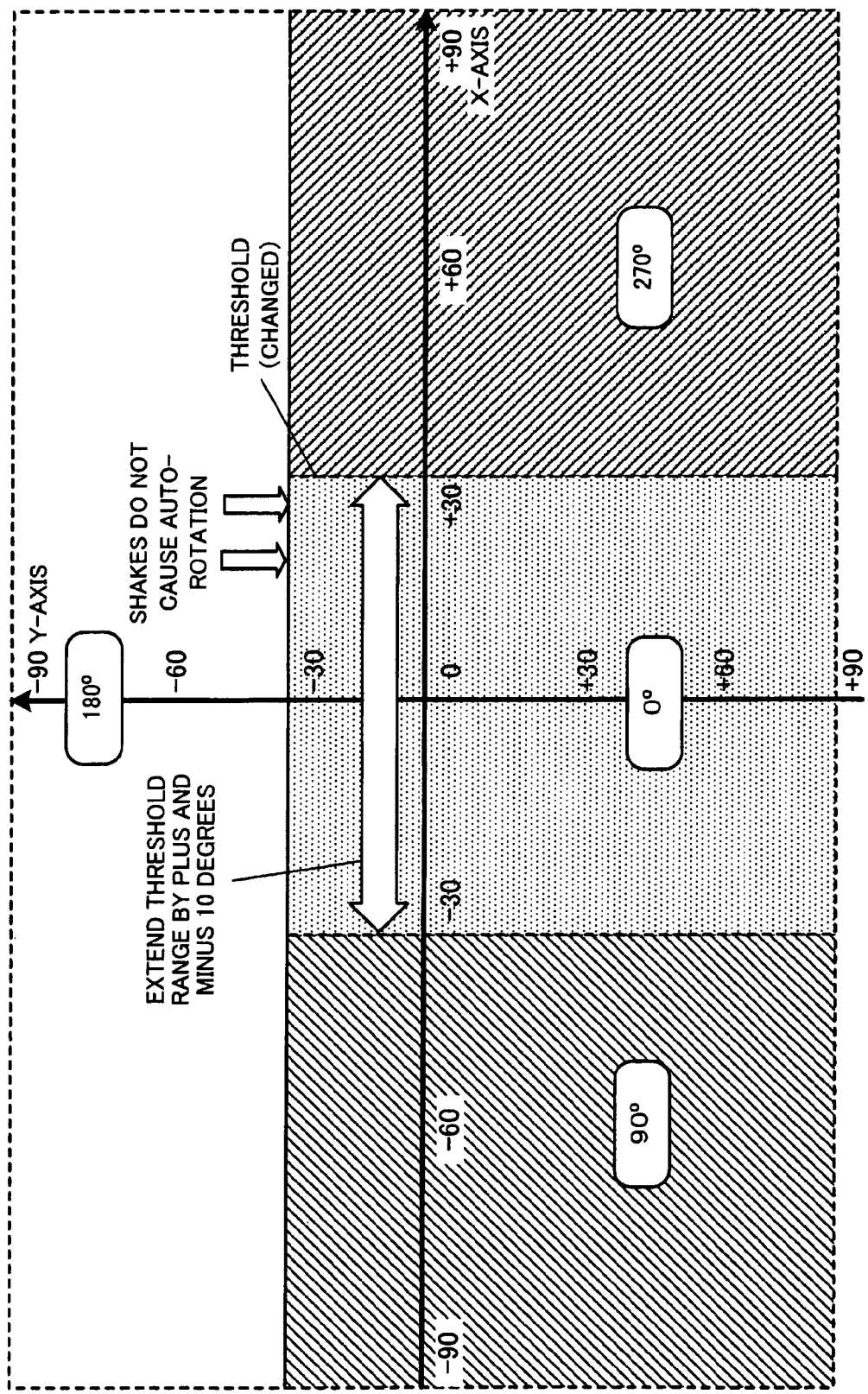

FIGS. 15 and 16 illustrate how to modify thresholds of control information in the second example of changes in angle of the information processing apparatus according to the second embodiment. In FIGS. 15 and 16, a vertical axis represents a y-axis rotation of the information processing apparatus 100, whereas a horizontal axis represents an x-axis rotation of the information processing apparatus 100. In addition, referring to FIGS. 15 and 16, as a threshold for the display screen 121a to have a display orientation with a rotation angle of 0 degree, a tilt angle around x-axis ranges from −20 to +20 degrees and a tilt angle around y-axis ranges from −40 to +90 degrees. As a threshold for the display screen 121a to have a display orientation with a rotation angle of +90 degrees, a tilt angle around x-axis ranges from −90 to −21 degrees and a tilt angle around y-axis ranges −40 to +90 degrees. As a threshold for the display screen 121a to have a display orientation with a rotation angle of +180 degrees, a tilt angle around x-axis is −91 degrees or lower or +91 degrees or greater, or a tilt angle around y-axis is −41 degrees or lower or +91 degrees or greater. As a threshold for the display screen 121a to have a display orientation with a rotation angle of −90 degrees, a tilt angle around x-axis ranges from +21 to +90 degrees, and a tilt angle around y-axis ranges from −40 to +90 degrees.

Figure 17:
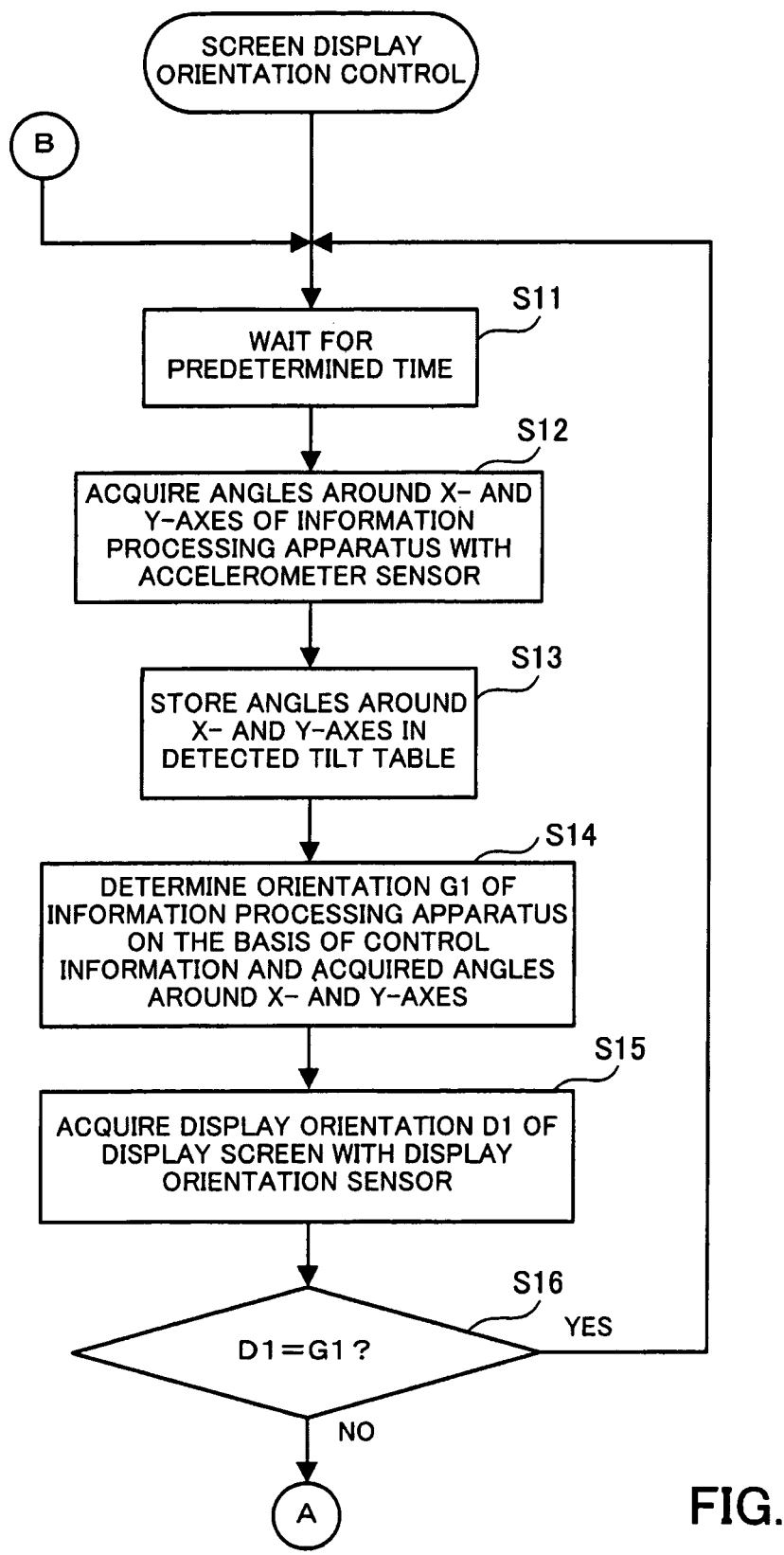
FIGS. 17 and 18 are a flowchart of a screen display orientation control process.
Figure 18:
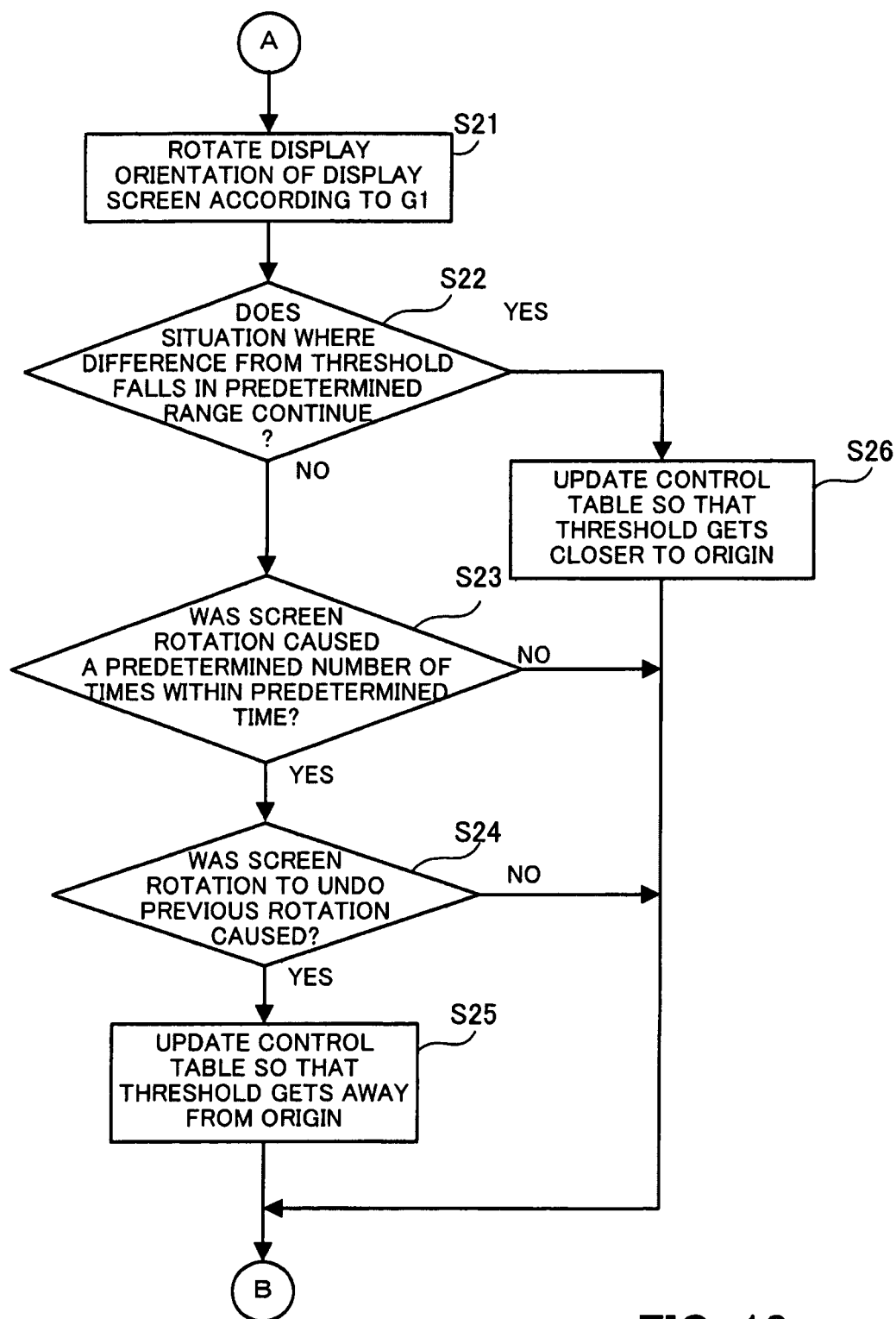

In this embodiment, if detected tilt angles of the information processing apparatus 100 change around a threshold for an auto-rotation, and an unintended auto-rotation is caused, the threshold for the display screen 121a to have the display orientation with a rotation angle of 0 degree is modified to range from −30 to +30 degrees by making the positive and negative threshold values of the tilt angle around x-axis away from the origin by 10 degrees, as illustrated in FIG. 16, which will be described with reference to FIGS. 17 and 18. If the auto-rotation of the display orientation of the display screen 121a occurs too frequently, the conditions for the auto-rotation are made stricter by modifying thresholds of the control information as described below, thereby making it possible to cause the auto-rotation as frequently as the user desires.

FIGS. 17 and 18 are a flowchart of a screen display orientation control process according to the second embodiment. The information processing apparatus 100 according to this embodiment performs the screen display orientation control process to control the display orientation of the display screen 121a according to the tilt of the information processing apparatus 100. In this embodiment, the information processing apparatus 100 performs the screen display orientation control process while displaying the display screen 121a on the LCD 121. The screen display orientation control process will now be described.

At step S11, the control unit 101 waits for a predetermined time (for example, for 0.1 second). Thereby, a process of detecting a tilt of the information processing apparatus 100 and changing the display orientation of the display screen 121a is performed at predetermined intervals.

At step S12, the control unit 101 causes the accelerometer sensor 117 to detect a tilt of the information processing apparatus 100, and acquires angles around x- and y-axes representing the detected tilt of the information processing apparatus 100.

At step S13, the control unit 101 stores the angles around x- and y-axes, acquired at step S12, in the detected tilt table 104a.

At step S14, the control unit 101 determines G1 that represents an orientation of the information processing apparatus 100 on the basis of the thresholds of the control information stored in the control table 103a and the angles around x- and y-axes acquired at step S12.

At step S15, the control unit 101 causes the display orientation sensor 102 to detect a current display orientation of the display screen 121a, and acquires D1 which represents the current display orientation of the display screen 121a.

At step S16, the control unit 101 determines whether G1 determined at step S14 matches D1 acquired at step S15. If they match (yes at step S16), the process goes back to step S11. Otherwise (no at step S16), the process proceeds to step S21 (FIG. 18).

At step S21, the control unit 101 rotates the display orientation of the display screen 121 according to G1 representing the orientation of the information processing apparatus 100.

More specifically, if G1 representing an orientation of the information processing apparatus 100 is "0 degree" (i.e., the downward direction of the information processing apparatus 100 matches the vertical downward direction), the control unit 101 displays the display screen 121a such that D1="0 degree" which means that the downward direction of the display screen 121a matches the downward direction of the information processing apparatus 100. If G1 is "−90 degrees" (i.e., the downward direction of the information processing apparatus 100 matches the user's left-hand direction), the control unit 101 displays the display screen 121a such that D1="−90 degrees" which means the downward direction of the display screen 121a matches the rightward direction of the information processing apparatus 100. If G1 is "+180 degrees" (i.e., the downward direction of the information processing apparatus 100 matches the vertical upward direction), the control unit 101 displays the display screen 121a such that D1="+180 degrees" which means the downward direction of the display screen 121a matches the upward direction of the information processing apparatus 100. If G1 is "+90 degrees" (i.e., the downward direction of the LCD 121 matches the user's right-hand direction), the control unit 101 displays the display screen 121a such that D1="+90 degrees" which means the downward direction of the display screen 121a matches the leftward direction of the information processing apparatus 100.

At step S22, the control unit 101 analyzes the detected tilt angles of the information processing apparatus 100 stored in the detected tilt table 104a to determine whether such a situation that the detected tilt angles of the information processing apparatus 100 do not reach a threshold for an auto-rotation of the display orientation but a difference between each detected tilt angle and the threshold falls in a predetermined range (for example, 10 degrees) continues for a predetermined time (for example, 0.6 second) or longer. If this situation continues for the predetermined time or longer (yes at step S22), the process proceeds to step S26. Otherwise (no at step S22), the process proceeds to step S23.

At step S23, the control unit 101 analyzes the detected tilt angles of the information processing apparatus 100 stored in the detected tilt table 104a to determine whether the display orientation was changed a predetermined number of times (for example, twice) or more within a predetermined time (for example, the last one second). If the display orientation was changed a predetermined number of times or more within the predetermined time (yes at step S23), the process proceeds to step S24. Otherwise (no at step S22), the process proceeds to step S11 (FIG. 17).

At step S24, the control unit 101 analyzes the detected tilt angles of the information processing apparatus 100 stored in the detected tilt table 104a to determine whether the display screen was rotated to undo a previous rotation. If the display screen was rotated to undo a previous rotation (yes at step S24), the process proceeds to step S25. Otherwise (no at step S24), the process proceeds to step S11.

The situation where the display screen is rotated to undo a previous rotation means that the display orientation is changed once and then returns back to the previous one because at least one of angles around x- and y-axes of the information processing apparatus crosses the same threshold twice, changing above and below the threshold.

At step S25, the control unit 101 updates the control information stored in the control table 103a so that the threshold which was crossed twice in undoing a previous rotation gets away from the origin (0 degree on x-axis and 0 degree on y-axis) by a predetermined angle (for example, 10 degrees). Then, the process goes back to step S11.

At step S26, the control unit 101 updates the control information stored in the control table 103a so that the threshold the difference of which from each detected tilt of the information processing apparatus 100 fell in the predetermined range for the predetermined time or longer gets closer to the origin by a predetermined angle (for example, 10 degrees). Then, the process goes back to step S11.

When the control table 103a is updated to modify an angle range around x-axis as a threshold for the rotation angle of "0 degree" at steps S25 and S26, the positive and negative threshold values are modified together at the same time so that rotations of the display orientation according to leftward and rightward tilts of the information processing apparatus 100 are caused bilaterally symmetrically.

For example, assume that the control table 103a indicates that an angle around x-axis ranges from −10 to +10 degrees as a threshold for a rotation angle of 0 degree, as illustrated in FIG. 6. If a threshold for a rotation angle of "−90 degrees" ("+11 to +90 degrees") is modified so as to get away from the origin by 10 degrees, the angle around x-axis as the threshold for the rotation angle of 0 degree is modified to range from "−10 to +20 degrees" accordingly by increasing the positive threshold value. In order to cause rotations of the display orientation according to leftward and rightward tilts of the information processing apparatus 100 bilaterally symmetrically, the negative threshold value of "−10 degrees" is also modified to get away from the origin, which decreases the negative threshold value. As a result, the angle around x-axis as the threshold for the rotation angle of 0 degree ranges from "−20 to +20 degrees". The same process applies to modify a threshold for the rotation angle of "+90 degrees".

According to this embodiment, the accelerometer sensor 117 is provided in the display unit 120 for detecting a tilt of the LCD 121 as a tilt of the information processing apparatus 100. Then, the display orientation of the display screen 121a is changed according to the detected tilt direction of the LCD 121. Alternatively, the accelerometer sensor 117 may be provided in another unit of the information processing apparatus 100, such as in the main body unit 130, and the display orientation of the display screen 121a may be changed according to a detected tilt direction of the information processing apparatus 100.

As described above, the second embodiment makes it possible to appropriately adjust the change of the display orientation of the display screen 121a of the LCD 121 by modifying the thresholds of the control information depending on changes in tilt of the information processing apparatus 100.

That is to say, a state of changes in tilt angle of the information processing apparatus 100 is captured, and if the changes in tilt angle are large, the thresholds of the control information are modified so that a large change causes an auto-rotation of the display orientation. If the changes in tilt angle are small, the thresholds of the control information are modified so that a small change causes an auto-rotation of the display orientation. This makes it possible to appropriately adjust the change of the display orientation of the display screen 121a of the LCD 121.

If the changes in tilt angle cross a threshold, the changes in tilt direction and tilt angle are determined large. This makes it possible to avoid the auto-rotation of the display orientation from being caused excessively due to changes in tilt angle repeatedly crossing the threshold.

When changes in tilt angle continued around but not across a threshold and then crossed the threshold, the changes in tilt direction and tilt angle are determined small. In the case where the user tilts the information processing apparatus 100, expecting an auto-rotation of the display orientation, but this tilt is not sufficient, thresholds are modified so as to cause the auto-rotation easily.

Third Embodiment

The following describes a third embodiment. The following description focuses on different features from the above-described second embodiment. The same reference numerals are used in this embodiment as in the second embodiment for corresponding components, and the same features will not be repeatedly described.

What is different from the second embodiment is that the third embodiment prepares two kinds of control information defining different threshold levels, and appropriately uses these two kinds of control information depending on changes in tilt of an information processing apparatus.

Figure 19:
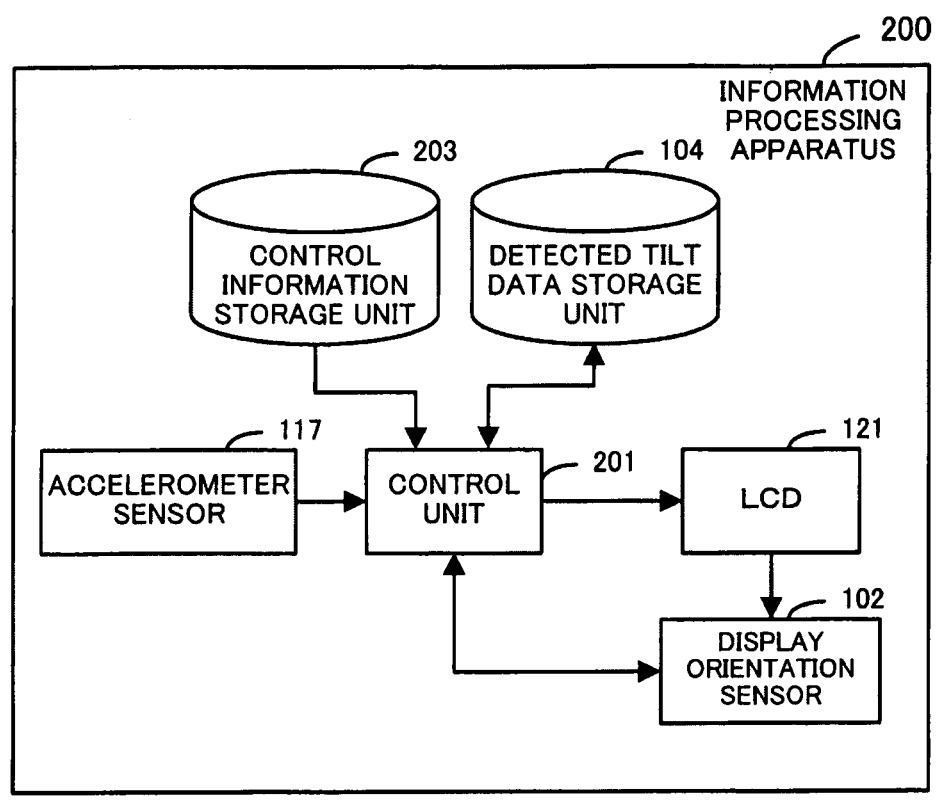
FIG. 19 is a block diagram of an information processing apparatus according to a third embodiment.

FIG. 19 is a block diagram of an information processing apparatus according to the third embodiment. The illustrated information processing apparatus 200 is provided with a function of displaying images, and includes a control unit 201, a display orientation sensor 102, a control information storage unit 203, a detected tilt data storage unit 104, an accelerometer sensor 117, and an LCD 121.

The control unit 201 analyzes detected tilt data stored in the detected tilt data storage unit 104 to capture a state of the changes in tilt angle.

Then, the control unit 201 uses appropriate control information stored in the control information storage unit 203 depending on the captured state of the changes. If the changes in tilt angle around x-axis are small, control information providing higher horizontal sensitivity is used in changing the display orientation of a display screen 121a. If the changes in tilt angle are large, control information providing lower horizontal sensitivity is used.

Then, the control unit 201 changes the display orientation of the display screen 121a on the basis of the control information providing the higher horizontal sensitivity or the lower horizontal sensitivity, and a detected tilt orientation and tilt angle. This makes it possible to adjust the auto-rotation of the display orientation of the display screen 121a depending on whether the changes in tilt of the information processing apparatus 200 are large or small.

The display orientation sensor 102 detects a display orientation of the display screen 121a displayed on the LCD 121. To this end, for example, the control unit 201 notifies the display orientation sensor 102 of the display orientation of the LCD 121 on the basis of control exercised on the display orientation of the display screen 121a each time the display orientation is changed, automatically by the control unit 201 or by a user or an application.

The control information storage unit 203 stores control information that indicates correlations between tilts of the information processing apparatus 200 to be detected by the accelerometer sensor 117 and display orientations of the display screen 121a. On the basis of these correlations indicated by the control information, the display orientation of the display screen 121a of the information processing apparatus 200 is changed. In addition, the control information includes thresholds of a tilt direction and tilt angle to be detected by the accelerometer sensor 117, for determining whether to change the display orientation of the display screen 121a.

In this embodiment, the control information storage unit 203 stores two kinds of control information that indicate correlations between tilts of the information processing apparatus 200 and display orientations of the display screen 121a. One of these provides higher horizontal sensitivity so that a relatively small change in angle causes a change of the display orientation of the display screen 121a. The other control information provides lower horizontal sensitivity so that a larger change in angle than the former change causes a change of the display orientation of the display screen 121a. This embodiment appropriately uses these two kinds of control information depending on changes in detected tilt of the information processing apparatus 200 in order to adjust occurrence of the auto-rotation of the display screen.

The detected tilt data storage unit 104 stores detected tilt data indicating a history of tilt directions and tilt angles detected by the accelerometer sensor 117. The detected tilt data indicates changes of tilt directions and tilt angles detected at a predetermined number of past time points. These past tilt directions and tilt angles of the information processing apparatus 200 indicated by the detected tilt data are used for determining whether changes in tilt angle of the information processing apparatus 200 are large or small.

The accelerometer sensor 117 detects a tilt direction and tilt angle of the information processing apparatus 200 with respect to the vertical downward direction. To control the display orientation of the display screen 121a, the accelerometer sensor 117 detects a tilt of the LCD 121 as a tilt of the information processing apparatus 200. The accelerometer sensor 117 detects the tilt direction of the LCD 121 by detecting the direction of gravity on the basis of acceleration applied to the accelerometer sensor 117. Instead of detecting acceleration, a gyro sensor or the like may be employed in the information processing apparatus 200 to detect the direction of operation, thereby detecting the tilt direction of the LCD 121.

The LCD 121 is able to change the display orientation of the display screen 121a for displaying information in four directions: "upright", "upside down", "rotated left", and "rotated right". Instead, the LCD 121 may be designed to change the display orientation of the display screen 121a in three or less directions or five or more directions. Furthermore, the LCD 121 may be designed to change the display orientation of the display screen 121a in any desired directions. Still further, the LCD 121 is able to display information such as text information and graphic information including motion pictures and still pictures.

This embodiment prepares a plurality of control information that provides different threshold levels according to states of changes in angle around x-axis. Instead, a plurality of control information may be prepared to provide different threshold levels according to states of changes in angle around y-axis. Furthermore, a plurality of control information may be prepared, which provides only one threshold level for states of changes in angle around x-axis, and different threshold levels for states of changes in angle around y-axis.

FIG. 20 illustrates a control table according to the third embodiment. The illustrated control table 203a is created and managed by the control unit 101, and is stored in an HDD 113 serving as the control information storage unit 203. The control table 203a is a table for storing control information that indicates correlations between display orientations of the display screen 121a and tilts of the information processing apparatus 200, and is used in controlling the display orientation of the display screen 121a.

Similarly to the control table 103a of the second embodiment, the control table 203a has fields for "Rotation Angle", "Angle Range Around X-axis", and "Angle Range Around Y-axis." Other than these fields, which are also provided in the control table 103a, this control table 203a has a field for "Setting." Data in fields arranged in a horizontal direction is associated with each other to compose one piece of control information.

The "Setting" field contains information about a threshold level set for one kind of control information. The control information with setting of "higher horizontal sensitivity" provides higher sensitivity, which is suitable for the case where changes in tilt of the information processing apparatus 200 are relatively small. On the other hand, the control information with setting of "lower horizontal sensitivity" provides lower sensitivity, which is suitable for the case where changes in tilt of the information processing apparatus 200 are relatively large, and especially, for the case where the change of the display orientation is to be suppressed. As compared with the control information providing higher horizontal sensitivity, the control information providing lower horizontal sensitivity defines a wider angle range around x-axis as a threshold for a rotation angle of 0 degree. This needs a large tilt for a rotation angle of +90 or −90 degrees, meaning that the display orientation is not easily changed.

This embodiment prepares control information that provides two kinds of settings. Alternatively, control information providing three or more kinds of settings may be prepared.

Figure 21:
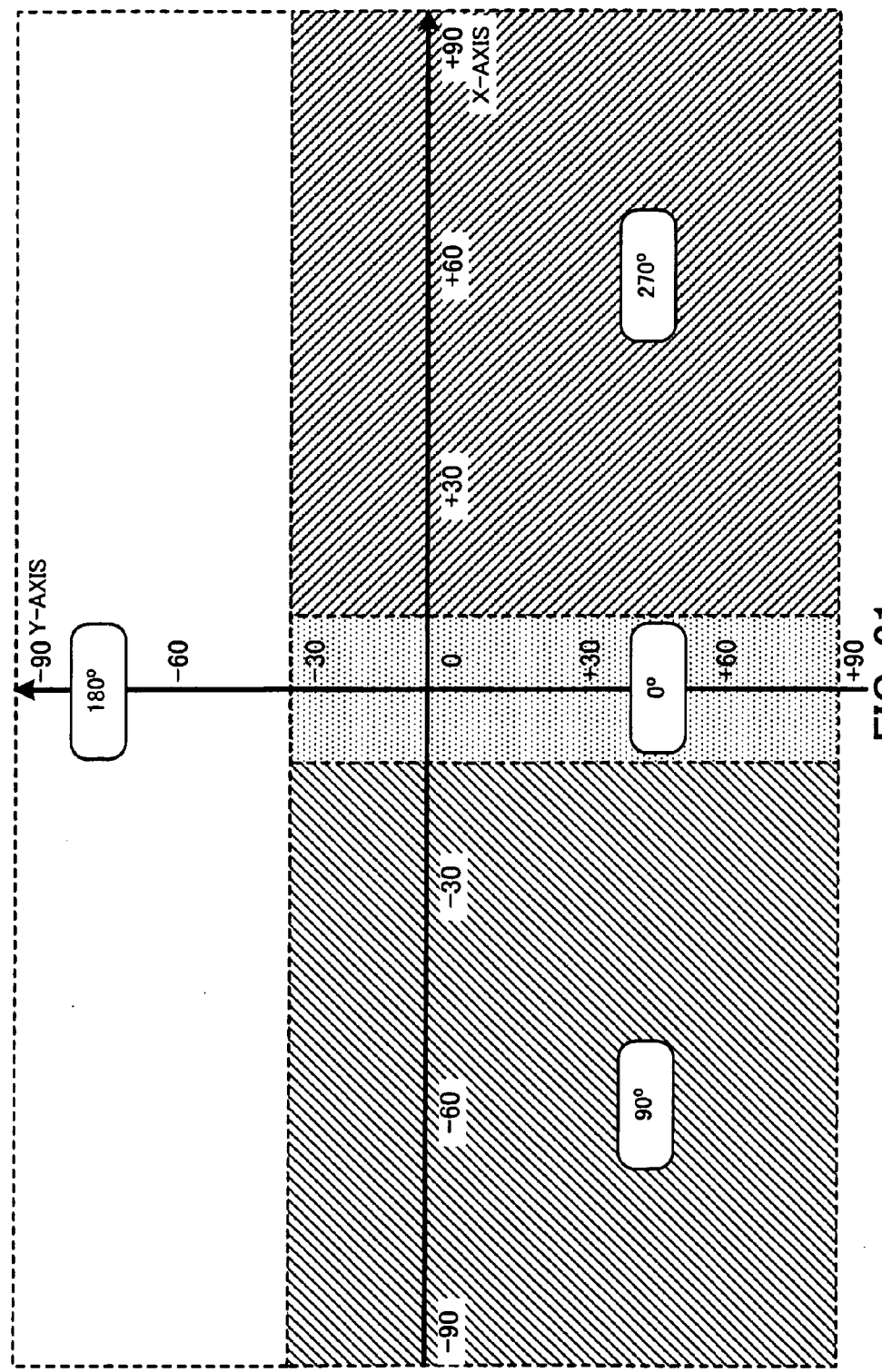
FIG. 21 illustrates a first example setting in control information in the information processing apparatus according to the third embodiment.
Figure 22:
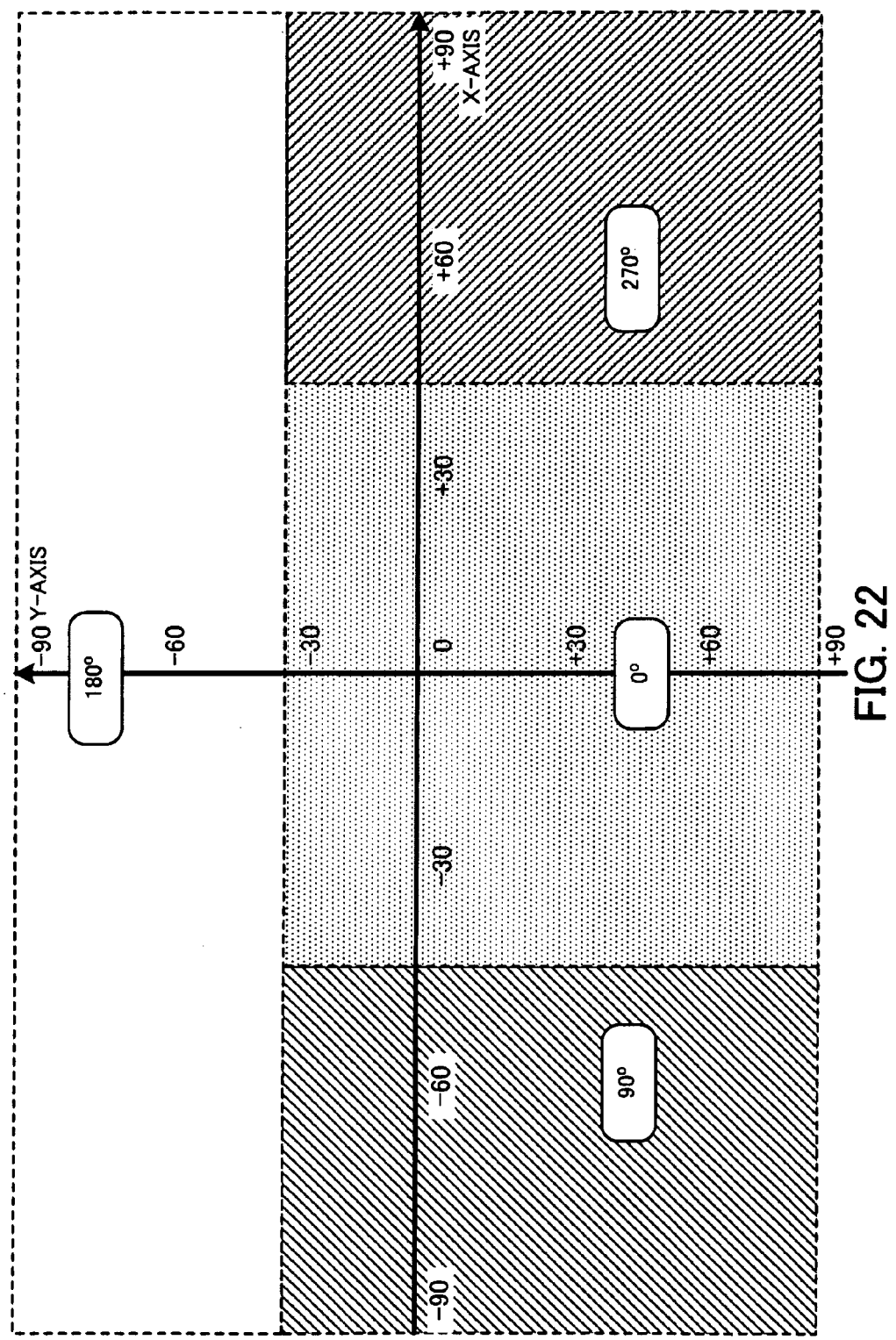
FIG. 22 illustrates a second example setting in control information in the information processing apparatus according to the third embodiment.

FIGS. 21 and 22 illustrate first and second example settings in control information in the information processing apparatus according to the third embodiment, respectively. FIG. 21 illustrates setting of "higher horizontal sensitivity" in the control information of the control table 203a described above with reference to FIG. 20. FIG. 22 illustrates setting of "lower horizontal sensitivity" in the control information of the control table 203a described above with reference to FIG. 20. In FIGS. 21 and 22, a vertical axis represents a y-axis rotation of the information processing apparatus 200, whereas a horizontal axis represents an x-axis rotation of the information processing apparatus 200.

Referring to FIG. 21, the control information providing higher horizontal sensitivity defines a tilt angle around x-axis ranging from −10 to +10 degrees and a tilt angle around y-axis ranging from −40 to +90 degrees as a threshold for the display screen 121a to have a display orientation with a rotation angle of 0 degree. Further, this control information defines a tilt angle around x-axis ranging from −90 to −11 degrees and a tilt angle around y-axis ranging from −40 to +90 degrees as a threshold for the display screen 121a to have a display orientation with a rotation angle of +90 degrees. Still further, the control information defines a tilt angle around x-axis of −91 degrees or lower or +91 degrees or greater, or a tilt angle around y-axis of −41 degrees or lower or +91 degrees or greater, as a threshold for the display screen 121a to have a display orientation with a rotation angle of +180 degrees. Still further, the control information defines a tilt angle around x-axis ranging from +11 to +90 degrees and a tilt angle around y-axis ranging from −40 to +90 degrees as a threshold for the display screen 121a to have a display orientation with a rotation angle of −90 degrees.

Referring to FIG. 22, the control information providing lower horizontal sensitivity defines a tilt angle around x-axis ranging from −40 to +40 degrees and a rotation angle around y-axis ranging from −40 to +90 degrees as a threshold for the display screen 121a to have a display orientation with a rotation angle of 0 degree. Further, this control information defines a tilt angle around x-axis ranging from −90 to −41 degrees and a tilt angle around y-axis ranging from −40 to +90 degrees as a threshold for the display screen 121a to have a display orientation with a rotation angle of +90 degrees. Still further, the control information defines a tilt angle around x-axis of −91 degrees or lower or +91 degrees or greater, or a tilt angle around y-axis of −41 degrees or lower or +91 degrees or greater, as a threshold for the display screen 121a to have a display orientation with a rotation angle of +180 degrees. Still further, the control information defines a tilt angle around x-axis ranging from +41 to +90 degrees and a tilt angle around y-axis ranging from −40 to +90 degrees as a threshold for the display screen 121a to have a display orientation with a rotation angle of −90 degrees.

Figure 23:
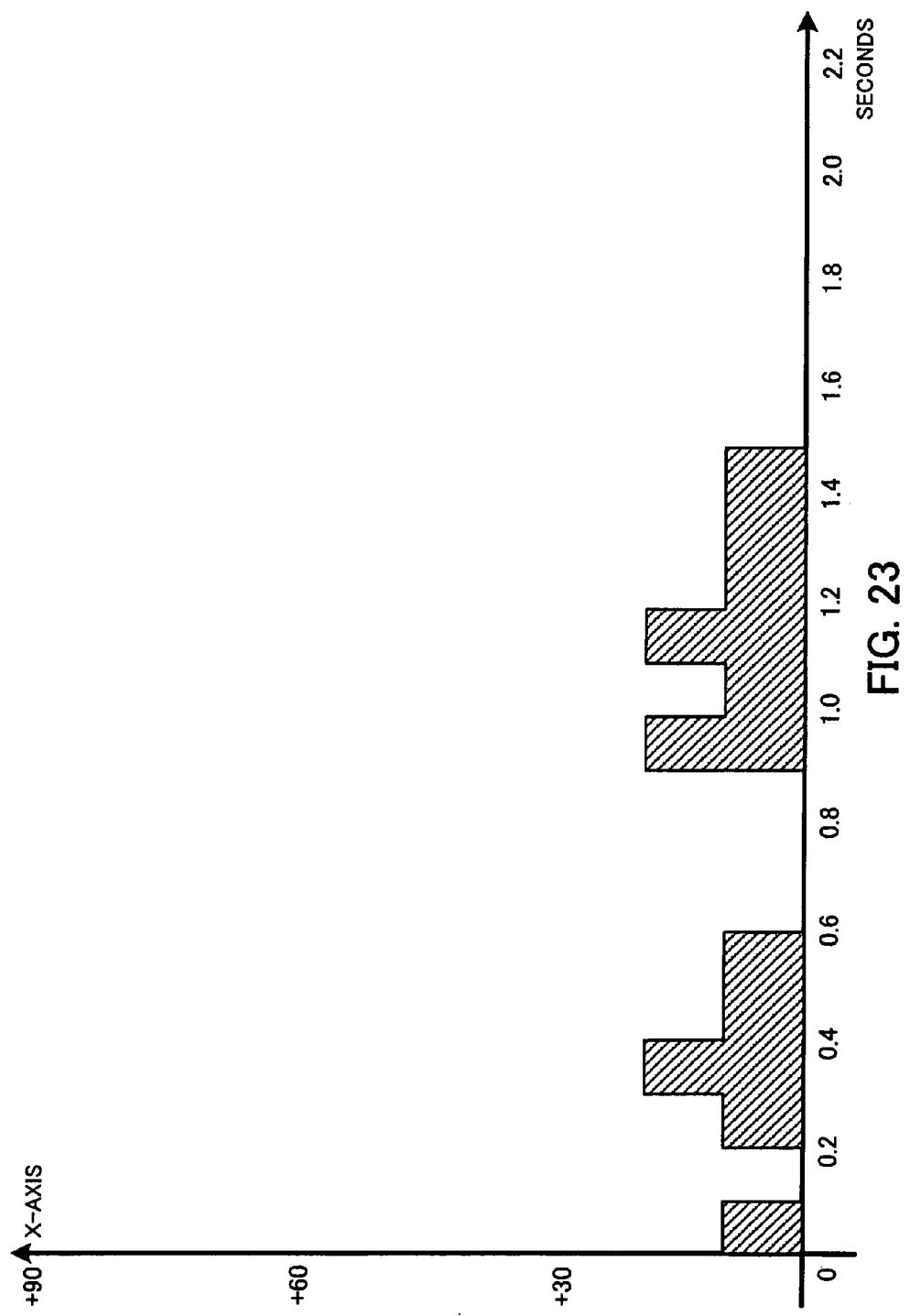
FIG. 23 illustrates a first example of changes in angle of the information processing apparatus according to the third embodiment.
Figure 24:
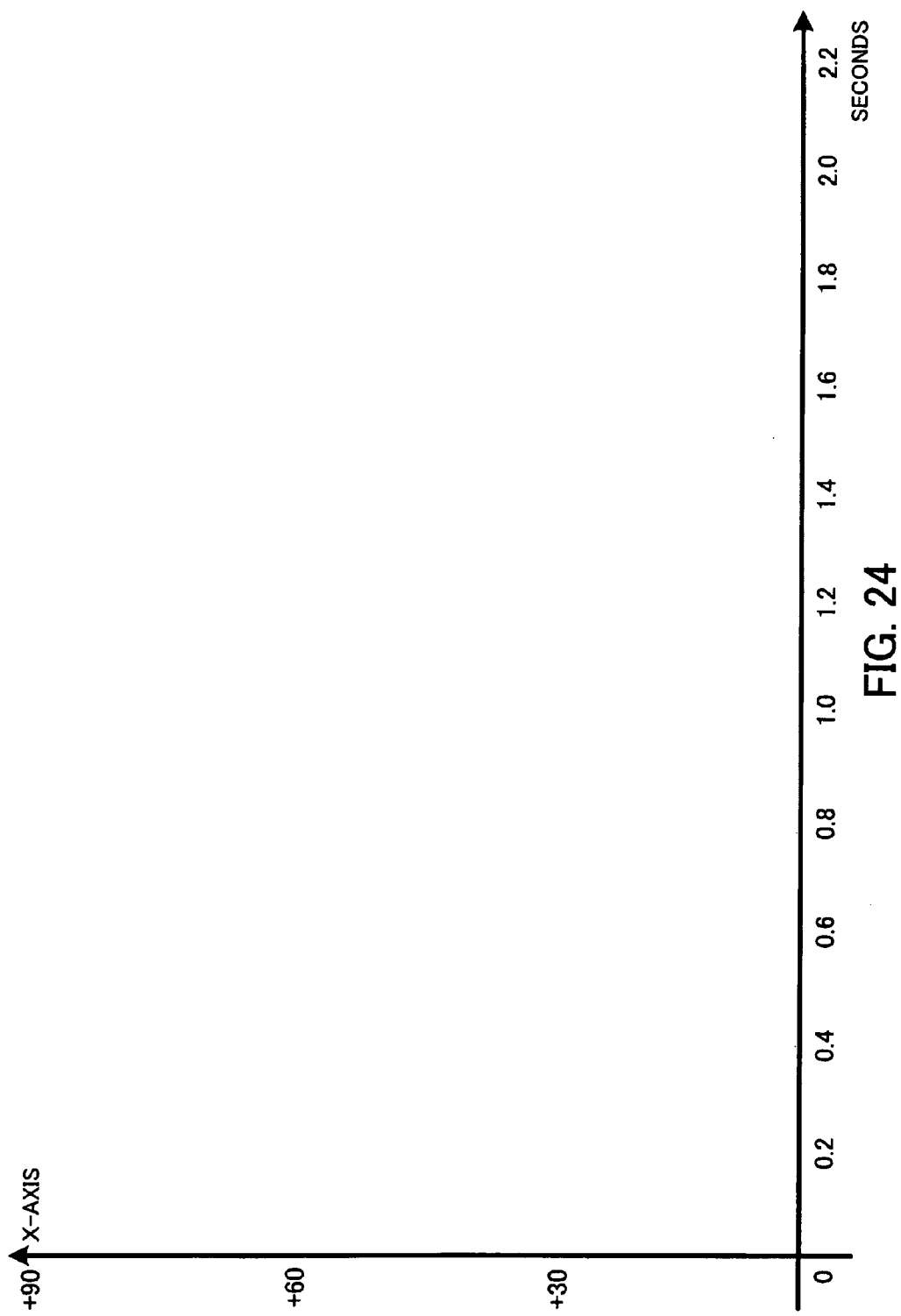
FIG. 24 illustrates a second example of change in angle of the information processing apparatus according to the third embodiment.

FIGS. 23 and 24 illustrate first and second examples of changes in angle of the information processing apparatus according to the third embodiment, respectively. FIG. 23 illustrates an example change in angle around x-axis in the case where changes in tilt of the information processing apparatus 200 are relatively large because, for example, the information processing apparatus 200 shakes in a train or the like. FIG. 24 illustrates an example change in angle around x-axis in the case where changes in tilt of the information processing apparatus 200 are relatively small because, for example, the information processing apparatus 200 is stable on a desk or the like. In FIGS. 23 and 24, a vertical axis represents a tilt around x-axis of the information processing apparatus 200, whereas a horizontal axis represents a time during which the tilt is applied. It is assumed that, for simple explanation, the user makes only an x-axis rotation by tilting the information processing apparatus 200, and makes no y-axis rotation.

According to this embodiment, the control information providing lower horizontal sensitivity, as illustrated in FIG. 22, is used in the case where changes in tilt of the information processing apparatus 200 are relatively large, as illustrated in FIG. 23. On the other hand, the control information providing higher horizontal sensitivity, as illustrated in FIG. 21, is used in the case where changes in tilt of the information processing apparatus 200 are relatively small, as illustrated in FIG. 24. To appropriately use the control information providing different threshold levels depending on situation in this way makes it possible to adjust the occurrence of the auto-rotation of the display orientation in order to thereby change the display orientation for the user to feel comfortable to view.

Figure 25:
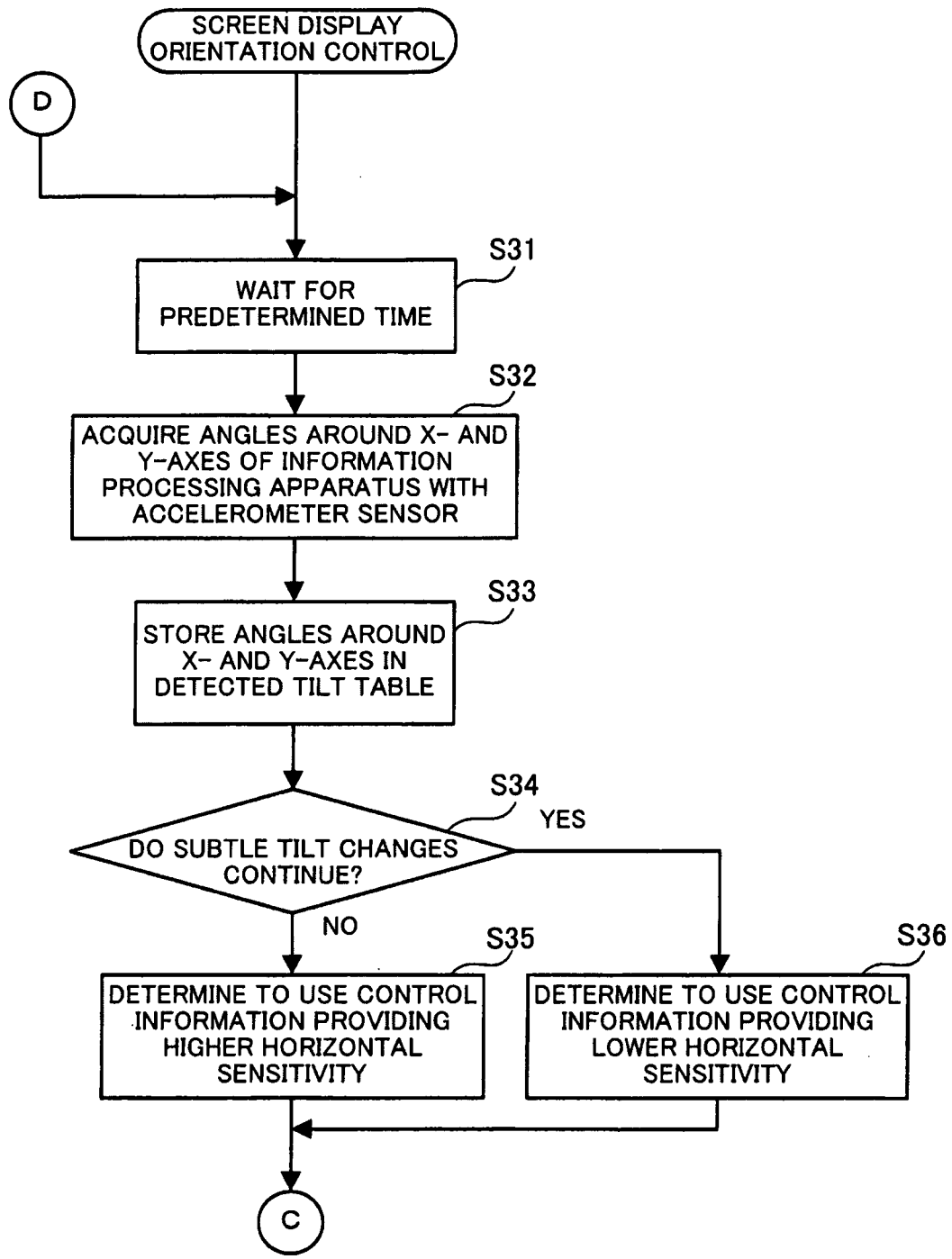
FIGS. 25 and 26 are a flowchart of a screen display orientation control process according to the third embodiment.
Figure 26:
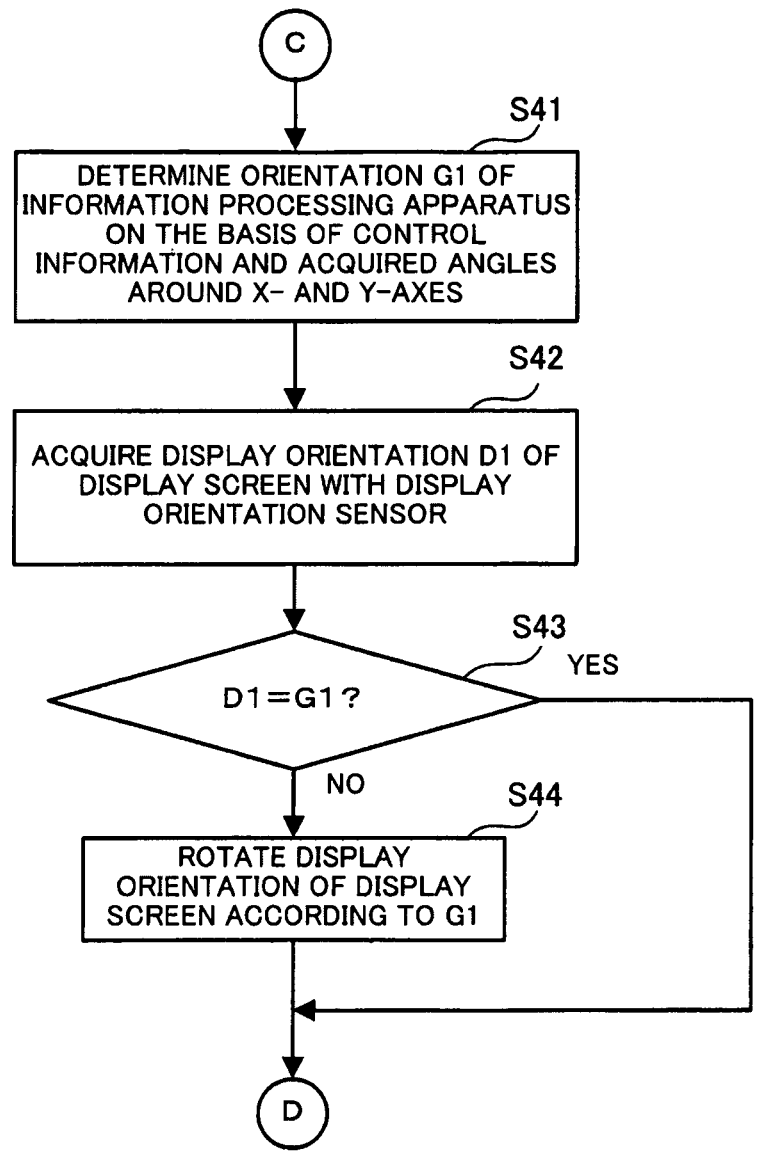

FIGS. 25 and 26 are a flowchart of a screen display orientation control process according to the third embodiment. The information processing apparatus 200 according to this embodiment performs the screen display orientation control process to control the display orientation of the display screen 121a according to a tilt of the information processing apparatus 200. In this embodiment, the information processing apparatus 200 performs the screen display orientation control process while displaying the display screen 121a on the LCD 121. The screen display orientation control process will now be described.

At step S31, the control unit 201 waits for a predetermined time (for example, 0.1 second). Thereby, a process of detecting a tilt of the information processing apparatus 200 and changing the display orientation of the display screen 121a is performed at predetermined intervals.

At step S32, the control unit 201 causes the accelerometer sensor 117 to detect a tilt of the information processing apparatus 200, and acquires angles around x- and y-axes representing the detected tilt of the information processing apparatus 200.

At step S33, the control unit 201 stores the angles around x- and y-axes, acquired at step S32, in a detected tilt table 104a.

At step S34, the control unit 201 analyzes the tilts of the information processing apparatus 200 stored in the detected tilt table 104 to determine whether subtle changes continue in the tilts of the information processing apparatus 200. If the subtle changes continue (yes at step S34), the process proceeds to step S36. Otherwise (no at step S34), the process proceeds to step S35.

The subtle changes in tilt are found by tracking changes in angles around x- and y-axes of the information processing apparatus 200, stored in the detected tilt table 104a, and determining whether subtle shakes and swings are periodically monitored or not. For example, it may be determined that subtle changes in tilt continue if consecutive detected tilt data indicates that there were changes of predetermined angle (for example, 5 degrees) or less a predetermined number of times (for example, 10 times) or more within a predetermined time (for example, 3 seconds).

At step S35, the control unit 201 determines to use the thresholds of the control information providing higher horizontal sensitivity stored in the control table 203a. Then, the process proceeds to step S41.

At step S36, the control unit 201 determines to use the thresholds of the control information providing lower horizontal sensitivity stored in the control table 203a. Then, the process proceeds to step S41.

At step S41, the control unit 201 determines G1 representing an orientation of the information processing apparatus 200 on the basis of the thresholds of the control information determined at step S35 or S36 as a result of the determination of step S34, the angles around x- and y-axes acquired at step S32.

At step S42, the control unit 201 causes the display orientation sensor 102 to detect a current display orientation of the display screen 121a, and acquires D1 representing the detected current display orientation of the display screen 121a.

At step S43, the control unit 201 determines whether G1 determined at step S41 matches D1 acquired at step S42. If G1 and D1 match (yes at step S43), the process proceeds to step S31 (FIG. 25). Otherwise (no at step S43), the process proceeds to step 44.

At step S44, the control unit 201 rotates the display orientation of the display screen 121a according to G1 representing the orientation of the information processing apparatus 200. Then, the process proceeds to step S31.

As described above, the third embodiment makes it possible to appropriately adjust the change of the display orientation of the display screen 121a of the LCD 121 by using the thresholds of appropriate control information depending on changes in tilt of the information processing apparatus 200.

In addition, if the state of changes in tilt angle of the information processing apparatus 200 indicates that the changes in tilt angle around x-axis are small, the control information providing higher horizontal sensitivity is used as control information in changing the display orientation of the display screen 121a. If the changes in tilt angle around x-axis are large, the control information providing lower horizontal sensitivity is used. This makes it possible to appropriately adjust the change of the display orientation of the display screen 121a of the LCD 121.

If changes in tilt angle cross a threshold, the changes in tilt direction and tilt angle are determined large. This makes it possible to avoid the auto-rotation of the display orientation from being caused excessively due to changes in tilt angle repeatedly crossing the threshold.

In addition, when changes in tilt angle continued around but not across the threshold and then crossed the threshold, the changes in tilt direction and tilt angle are determined small. In the case where the user tilts the information processing apparatus 200, expecting the auto-rotation of the display orientation, but this tilt is not sufficient, a different threshold level are used so as to cause the auto-rotation easily.

Fourth Embodiment

The following describes the fourth embodiment. The following description focuses on different features from the above-described second embodiment. The same reference numerals are used in this embodiment as in the second embodiment for corresponding components, and the same features will not be repeatedly described.

What is different from the second embodiment is that the fourth embodiment does not set different threshold levels in control information, but adjusts the occurrence of auto-rotation of a display orientation by correcting a tilt angle of an information processing apparatus detected by an accelerometer sensor.

Figure 27:
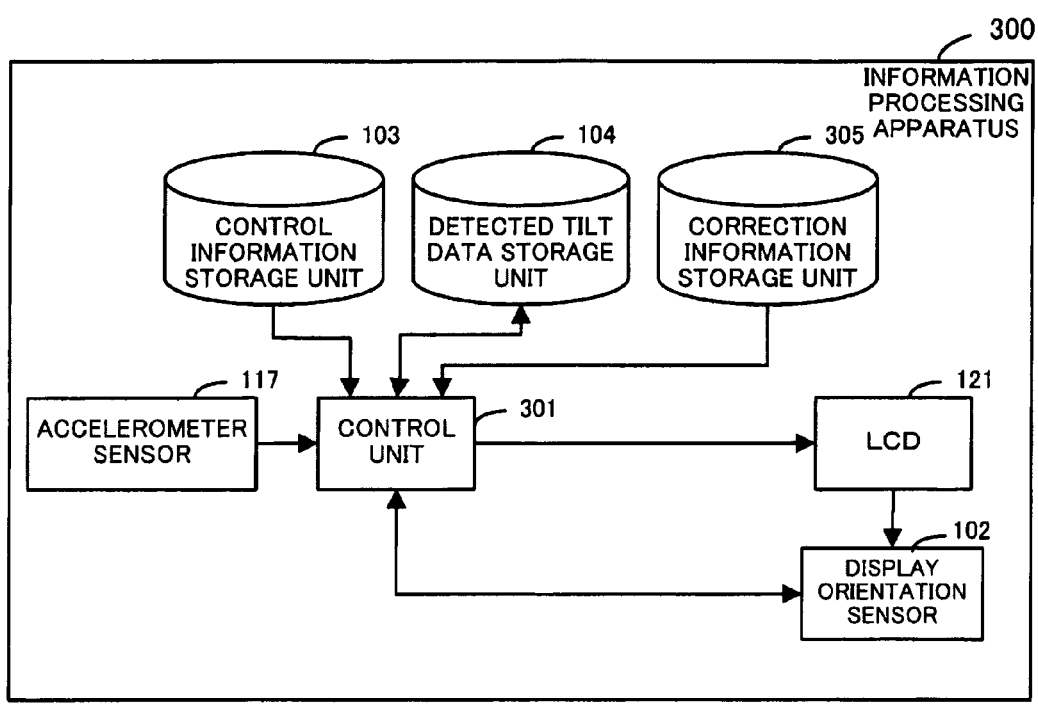
FIG. 27 is a block diagram of an information processing apparatus according to a fourth embodiment.

FIG. 27 is a block diagram of an information processing apparatus according to the fourth embodiment. The illustrated information processing apparatus 300 is provided with a function of displaying images. The information processing apparatus 300 has a control unit 301, a display orientation sensor 102, a control information storage unit 103, a detected tilt data storage unit 104, a correction information storage unit 305, an accelerometer sensor 117, and an LCD 121.

The control unit 301 analyzes detected tilt data stored in the detected tilt data storage unit 104 to capture a state of changes in tilt angle. More specifically, if the detected tilt data stored in the detected tilt data storage unit 104 indicates that the changes in tilt angle crossed a threshold, the control unit 301 determines that the changes in tilt direction and tilt angle are large. If the detected tilt data stored in the detected tilt data storage unit 104 indicates that the changes in tilt angle continued around but not across a threshold and then crossed the threshold, the control unit 301 determines that the changes in tilt direction and tilt angle are small.

Then, the control unit 301 corrects a detected tilt angle on the basis of correction information stored in the correction information storage unit 305 depending on the captured state of the changes in tilt angle, and changes the display orientation of a display screen 121a on the basis of control information stored in the control information storage unit 103, and a tilt direction and the corrected tilt angle. More specifically, the control unit 301 corrects the detected tilt angle on the basis of the correction information so that its absolute value is increased if the changes in tilt angle are small, and its absolute value is decreased if the changes in tilt angle are large.

Then, the control unit 301 changes the display orientation of the display screen 121a on the basis of the control information stored in the control information storage unit 103, the tilt direction, and the corrected tilt angle. With this approach, it becomes possible to adjust an auto-rotation of the display orientation of the display screen 121a depending on whether changes in tilt of the information processing apparatus 300 are large or small.

The display orientation sensor 102 detects a display orientation of the display screen 121a displayed on the LCD 121. To this end, for example, the control unit 301 may notify the display orientation sensor 102 of the display orientation of the LCD 121 on the basis of control exercised on the display orientation of the display screen 121a each time the display orientation is changed, automatically by the control unit 301 or by a user or an application.

The control information storage unit 103 stores control information that indicates correlations between tilts of the information processing apparatus 300 to be detected by the accelerometer sensor 117 and display orientations of the display screen 121a. On the basis of the correlations indicated by the control information, the display orientation of the display screen 121a of the information processing apparatus 300 is changed. In addition, the control information includes thresholds of a tilt direction and tilt angle to be detected by the accelerometer sensor 117, for use in determining whether to change the display orientation of the display screen 121a.

The detected tilt data storage unit 104 stores detected tilt data indicating a history of tilt directions and tilt angles detected by the accelerometer sensor 117. The detected tilt data indicates changes of tilt directions and tilt angles detected at a predetermined number of past time points. On the basis of the past tilt directions and tilt angles of the information processing apparatus 300, indicated by the detected tilt data, it is determined whether changes in tilt angle of the information processing apparatus 300 are large or small.

The accelerometer sensor 117 detects a tilt direction and tilt angle of the information processing apparatus 300 with respect to the vertical downward direction. More specifically, the accelerometer sensor 117 detects a tilt of the LCD 121 as a tilt of the information processing apparatus 300 in order to control the display orientation of the display screen 121a. In addition, the accelerometer sensor 117 detects the tilt direction of the LCD 121 by detecting the direction of gravity on the basis of acceleration applied to the accelerometer sensor 117. Instead of detecting acceleration, a gyro sensor or the like may be employed in the information processing apparatus 300 to detect the direction of operation, thereby detecting the tilt direction of the LCD 121.

The LCD 121 is able to display the display screen 121a for display information in four directions: "upright", "upside down", "rotated left", and "rotated right". Instead, the LCD 121 may be designed to display the display screen 121a in three or less directions or five or more directions. Alternatively, the LCD 121 may be designed to display the display screen 121a in any desired directions. Still further, the LCD 121 is able to display information such as text information and graphic information including motion pictures and still pictures on the display screen 121a.

The correction information storage unit 305 stores correction information that corrects a tilt angle detected by the accelerometer sensor 117 in such a way that its absolute value is increased in the case where detected tilt data indicates small changes, and is decreased in the case where the detected tilt data indicates large changes.

FIG. 28 illustrates a correction table according to the fourth embodiment. The illustrated correction table 305a is created and managed by the control unit 301, and is stored in an HDD 113 serving as the correction information storage unit 305. The correction table 305a is a table for storing correction information for correcting a tilt of the information processing apparatus 300 detected by the accelerometer sensor 117.

The correction table 305a has fields for "Item" and "Correction Angle". Data in fields arrange in a horizontal direction is associated with each other to compose one piece of correction information.

The "Item" field indicates conditions for applying correction information, including whether an angle to be corrected is on x-axis or y-axis and whether the angle is a positive angle or a negative angle.

The "Correction Angle" field contains a value for correcting an angle that meets corresponding conditions defined in the "Item" field.

In this fourth embodiment, "XPlus" is a positive value to be added to an angle around x-axis of the information processing apparatus 300 detected by the accelerometer sensor 117 if the angle is a positive value. "XMinus" is a negative value to be added to an angle around x-axis of the information processing apparatus 300 detected by the accelerometer sensor 117 if the angle is a negative value. "YPlus" is a positive value to be added to an angle around y-axis of the information processing apparatus 300 detected by the accelerometer sensor 117 if the angle is a positive value. "YMinus" is a negative value to be added to an angle around y-axis of the information processing apparatus 300 detected by the accelerometer sensor 117 if the angle is a negative value. By adding values, angles around x- and y-axes are corrected.

Figure 29:
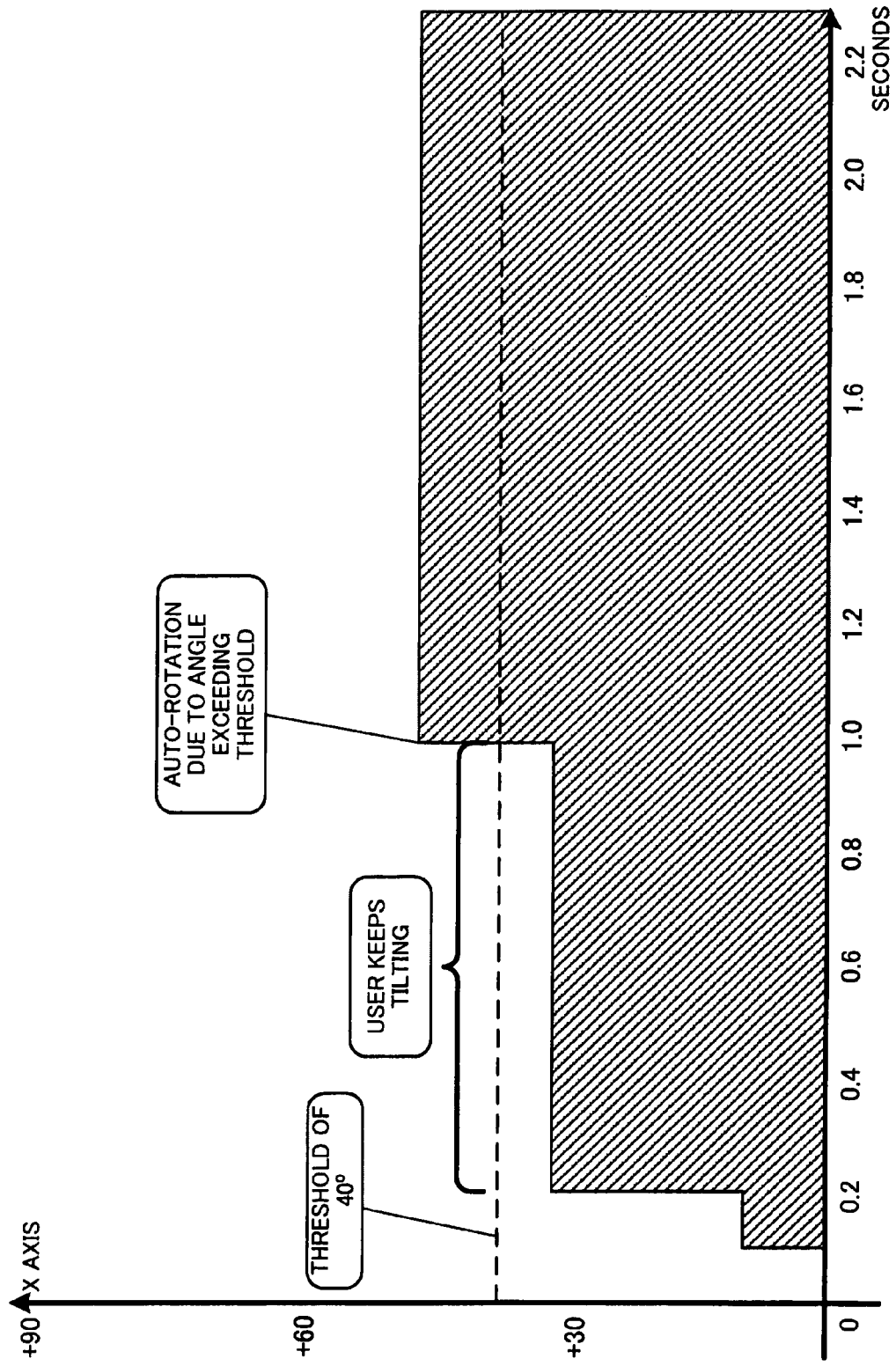
FIG. 29 illustrates an example of changes in angle of the information processing apparatus according to the fourth embodiment.
Figure 30:
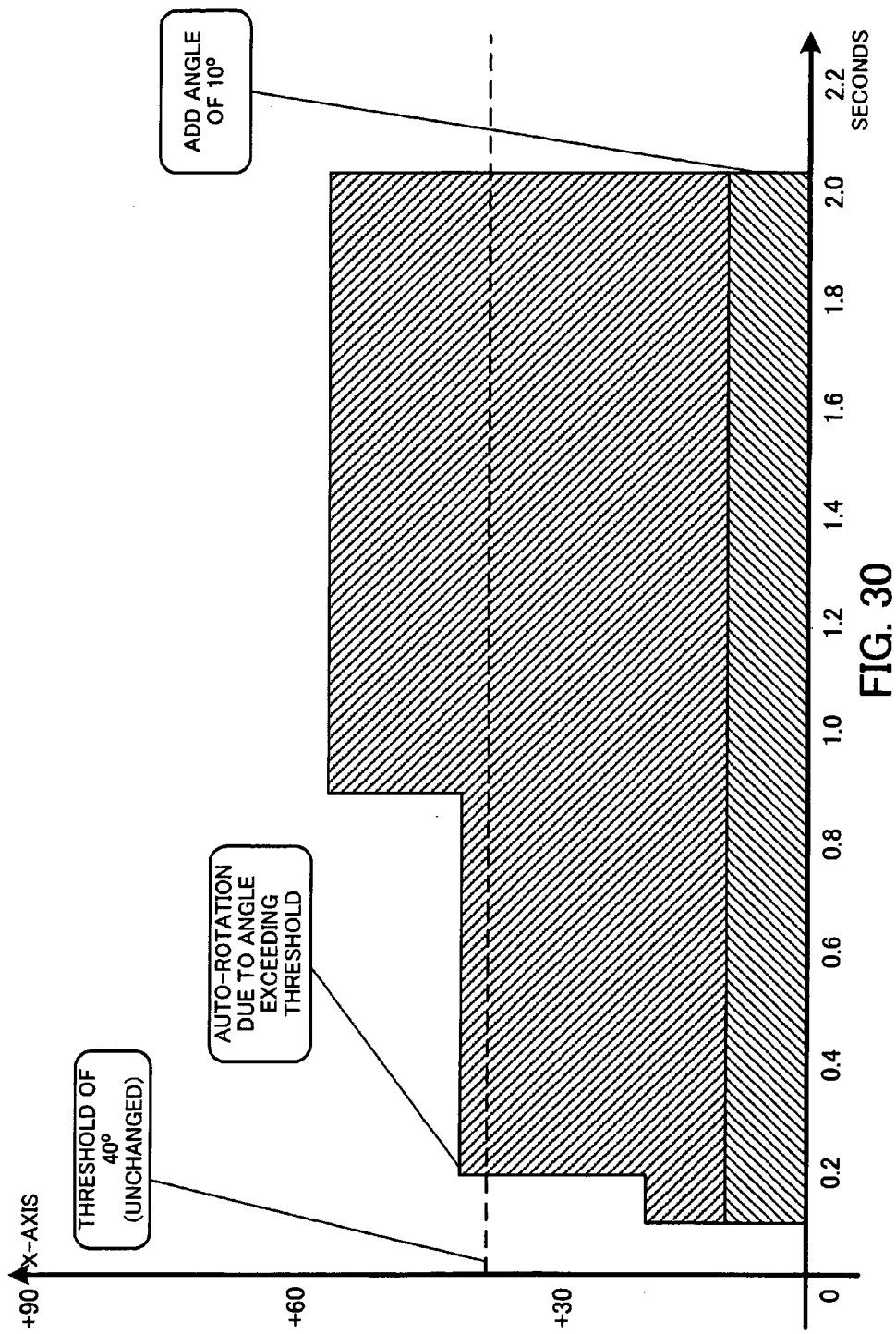
FIG. 30 illustrates how to correct an angle in the example of changes in angle of the information processing apparatus according to the fourth embodiment.

FIG. 29 illustrates an example of changes in angle of the information processing apparatus according to the fourth embodiment. FIG. 30 illustrates how to correct an angle of the information processing apparatus in the example of changes according to the fourth embodiment. In FIGS. 29 and 30, a vertical axis represents a tilt around x-axis of the information processing apparatus 300, whereas a horizontal axis represents a time during which the tilt is applied. It is assumed that, for simple explanation, the user makes only an x-axis rotation by tilting the information processing apparatus 300, and makes no y-axis rotation.

Similarly to FIG. 11, for example, assume that the user keeps tilting the information processing apparatus 300 clockwise around x-axis, expecting the display screen 121a to be displayed in a display orientation rotated counterclockwise by 90 degrees (a rotation angle of –90 degrees), as illustrated in FIG. 8B, but the tilt angle made by the user is lower than a threshold, which results in not causing an auto-rotation of the display orientation of the display screen 121a. In this case, the user would tilt the information processing apparatus 300 more to cause the desired auto-rotation. In this example, assume that the control information indicates a threshold of 40 degrees for automatically rotating the display orientation of the display screen 121a counterclockwise by 90 degrees. Therefore, a tilt angle around x-axis needs to exceed the threshold of 40 degrees in order to cause the user's desired auto-rotation.

Referring to FIG. 29, it is assumed that the user tilts the information processing apparatus 300 to such an extent that "this tilt will exceed the threshold for the desired auto-rotation", and the user keeps this tilt from the 0.2 second point to the 1.0 second point. However, the actual tilt angle around x-axis of the information processing apparatus 100 made by the user is 35 degrees. This tilt angle is still lower than the threshold of 40 degrees, resulting in not causing the user's desired auto-rotation.

Then, as illustrated in FIG. 29, considering that "the tilt applied to the information processing apparatus 300 is not sufficient", the user starts to tilt the information processing apparatus 300 more at the 1.0 second point. Thereby, the tilt angle around x-axis of the information processing apparatus 300 becomes 50 degrees, which exceeds the threshold of 40 degrees. As a result, the user's desired auto-rotation is caused, and the display orientation of the display screen 121a has a rotation angle of –90 degrees.

On the other hand, referring to FIG. 30, the tilt angle around x-axis of the information processing apparatus 300 detected by the accelerometer sensor 117 is corrected by correction information. Thereby, when the user tilts the information processing apparatus 300 to such an extent that "this tilt will exceed the threshold for the desired auto-rotation", at the 0.2 second point of FIG. 30, the tilt angle around x-axis of the information processing apparatus 300 becomes 50 degrees, which exceeds the threshold of 40 degrees. As a result, the user's desired auto-rotation is caused, and the display orientation of the display screen 121a has a rotation angle of –90 degrees.

According to this embodiment, as described above with reference to FIG. 30, there is a gap between a user's expected threshold and an actual threshold for an auto-rotation of the display screen 121a. If the auto-rotation is not caused by an angle that the user expects to cause the auto-rotation, the gap is decreased by correcting a detected tilt of the information processing apparatus 300, thereby making it possible to cause the auto-rotation by the user' expected angle for the auto-rotation.

Figure 31:
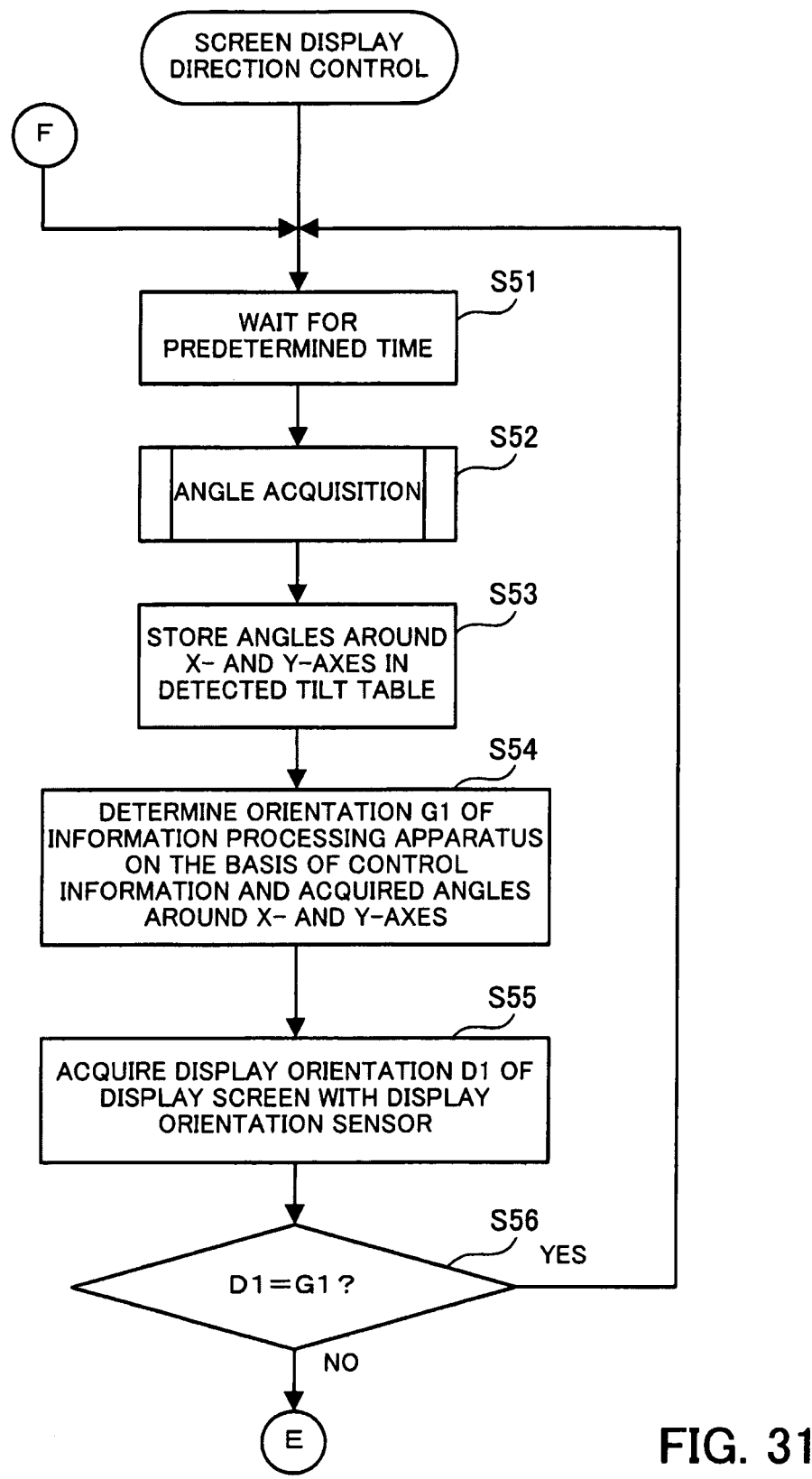
FIGS. 31 and 32 are a flowchart of a screen display orientation control process according to the fourth embodiment.
Figure 32:
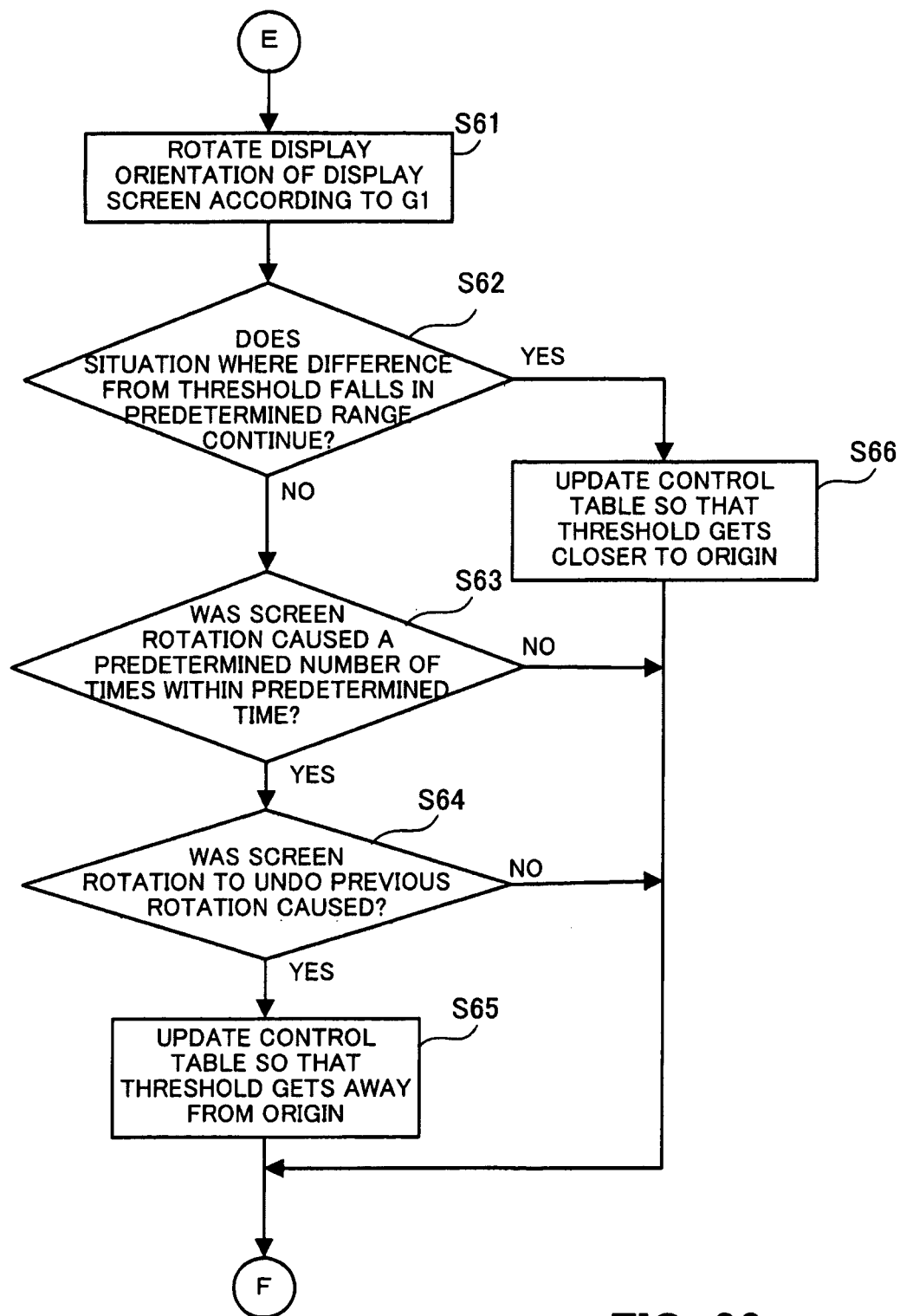

FIGS. 31 and 32 are a flowchart of a screen display orientation control process according to the fourth embodiment. The information processing apparatus 300 according to this embodiment performs the screen display orientation control process to control the display orientation of the display screen 121a on the basis of a tilt of the information processing apparatus 300. This information processing apparatus 300 performs the screen display orientation control process while displaying the display screen 121a on the LCD 121. The screen display orientation control process, will now be described.

At step S51, the control unit 301 waits for a predetermined time (for example, 0.1 second). Thereby, a process of detecting a tilt of the information processing apparatus 300 and changing the display orientation of the display screen 121a is performed at predetermined intervals.

At step S52, the control unit 301 performs an angle acquisition process, as will be described later with reference to FIGS. 33 and 34, to cause the accelerometer sensor 117 to detect a tilt of the information processing apparatus 300 in order to acquire angles around x- and y-axes representing the detected tilt of the information processing apparatus 300.

At step S53, the control unit 301 stores the angles around x- and y-axes, detected at step S52, in the detected tilt table 104a.

At step S54, the control unit 301 determines G1 representing an orientation of the information processing apparatus 300 on the basis of the thresholds of the control information stored in the control table 103a and the angles around x- and y-axes acquired at step S52.

At step S55, the control unit 301 causes the display orientation sensor 102 to detect a current display orientation of the display screen 121a, and acquires D1 representing the detected display orientation of the display screen 121a.

At step S56, the control unit 301 determines whether D1 determined at step S54 matches D1 acquired at step S55. If D1 and G1 match (yes at step S56), the process goes back to step S51. Otherwise (no at step S56), the process proceeds to step S61 (FIG. 32).

At step S61, the control unit 301 rotates the display orientation of the display screen 121a according to G1 representing the orientation of the information processing apparatus 300.

At step S62, the control unit 301 analyzes the tilts of the information processing apparatus 300 stored in the detected tilt table 104a to determine whether or not such a situation that the tilts do not reach a threshold for changing the display orientation but a difference between each tilt and the threshold falls in a predetermine range (for example, 10 degrees) continues for a predetermined time (0.6 second) or longer. If this situation continues for the predetermined time or longer (yes at step S62), the process proceeds to step S66. If the situation does not continue for the predetermined time or longer (no at step S62), the process proceeds to step S63.

At step S63, the control unit 301 analyzes the tilts of the information processing apparatus 300 stored in the detected tilt table 104a to determine whether the display orientation was changed a predetermined number of times (for example, twice) or more within a predetermined time (for example, the last one second). If the display orientation was changed the predetermined number of times or more within the predetermined time (yes at step S63), the process proceeds to step S64. Otherwise (no at step S63), the process goes back to step S51 (FIG. 31).

At step S64, the control unit 301 analyzes the tilts of the information processing apparatus 300 stored in the detected tilt table 104a to determine whether a screen rotation to undo a previous rotation was caused. If such a screen rotation was caused (yes at step S64), the process proceeds to step S65. Otherwise (no at step S64), the process goes back to step S51.

In this connection, the situation where a screen rotation to undo a previous rotation is caused means that a display orientation is changed once and then returns back to a previous one because at least one of angles around x- and y-axes of the information processing apparatus crosses the same threshold twice within a predetermined time (for example, one second), changing above and below the threshold.

At step S65, the control unit 301 updates the control information stored in the control tale 103a so that the threshold which was crossed twice in undoing the previous screen rotation, detected at step S64, gets away from the origin (0 degree on x-axis and 0 degree on y-axis) by a predetermined angle (for example, 10 degrees). Then, the process goes back to step S51.

At step S66, the control unit 301 updates the control information stored in the control tale 103a so that the threshold the difference of which from each tilt of the information processing apparatus 300 fell in the predetermined range for the predetermined time or longer, detected at step S62, gets closer to the origin by a predetermined angle (for example, 10 degrees). Then, the process goes back to step S51.

Figure 33:
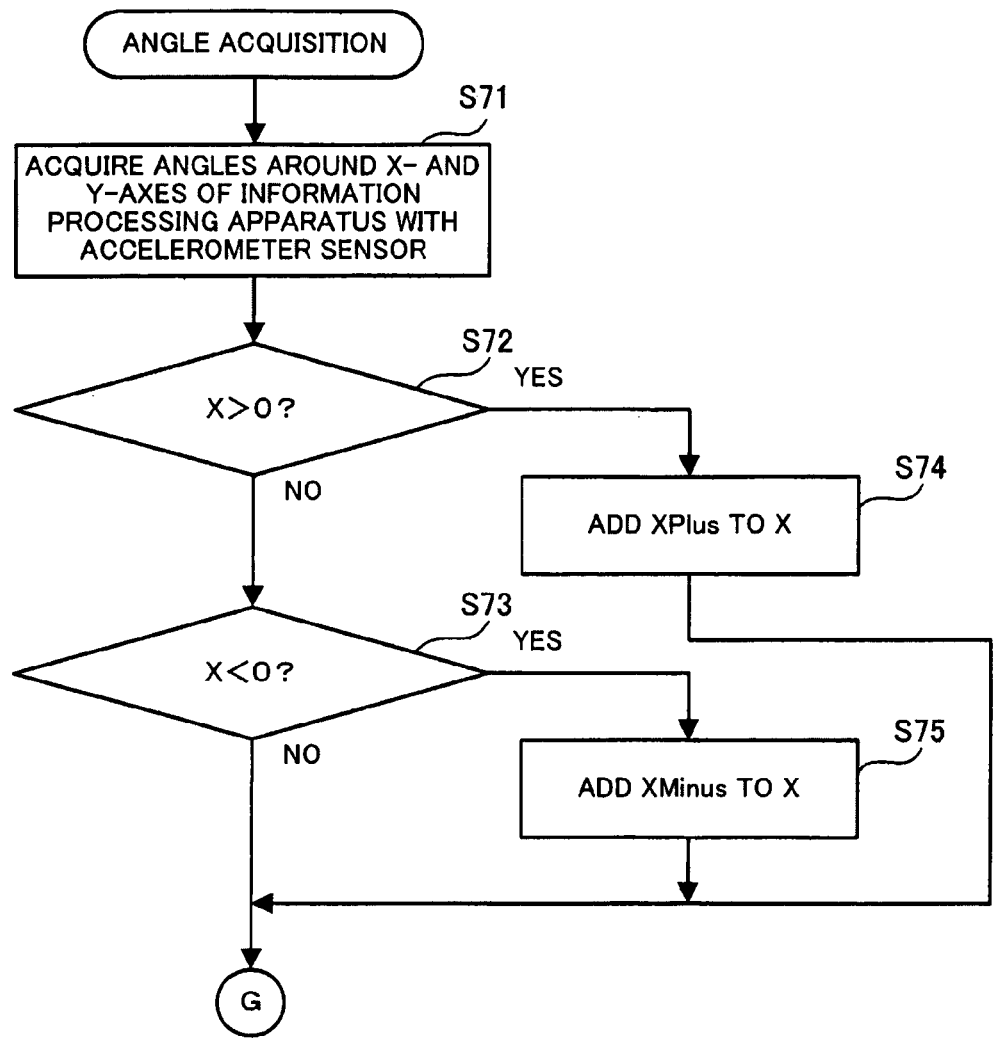
FIGS. 33 and 34 are a flowchart of an angle acquisition process according to the fourth embodiment.
Figure 34:
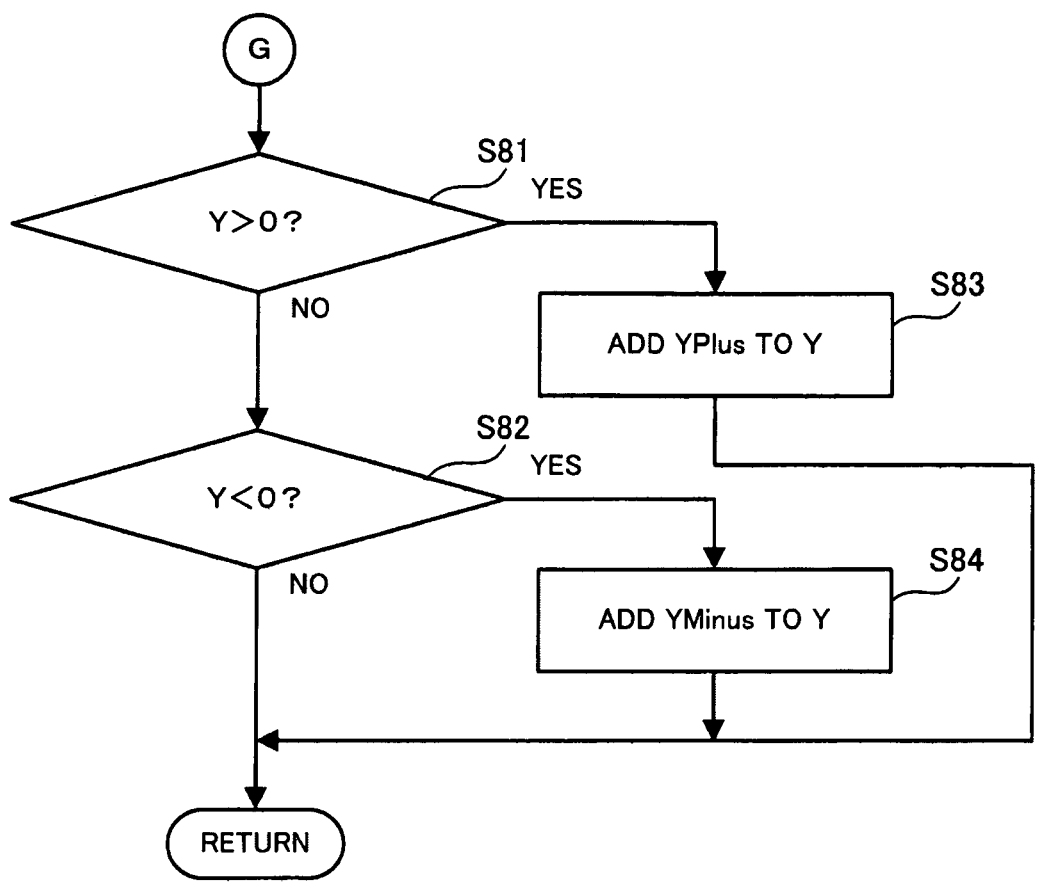

FIGS. 33 and 34 are a flowchart of an angle acquisition process according to the fourth embodiment. The information processing apparatus 300 according to this embodiment performs the angle acquisition process to detect a tilt of the information processing apparatus 300 and correct the angles around x- and y-axes of the detected tilt. In this embodiment, the angle acquisition process is called at step S52 of the screen display orientation control process. The angle acquisition process will now be described.

At step S71, the control unit 301 causes the accelerometer sensor 117 to detect a tilt of the information processing apparatus 300, and acquires angles around x- and y-axes indicating the detected tilt of the information processing apparatus 300.

At step S72, the control unit 301 determines whether the angle around x-axis detected by the accelerometer sensor 117 at step S71 exceeds 0 degree or not. If the angle around x-axis exceeds 0 degree (yes at step S72), the process proceeds to step S74. Otherwise (no at step S72), the process proceeds to step S73.

At step S73, the control unit 301 determines whether the angle around x-axis detected by the accelerometer sensor 117 at step S71 is less than 0 degree or not. If the angle around x-axis is less than 0 degree (yes at step S73), the process proceeds to step S75. Otherwise (no at step S73), the process proceeds to step S81 (FIG. 34).

At step S74, the control unit 301 adds XPlus stored in the correction table 305a to the angle around x-axis. Then, the process proceeds to step S81.

At step S75, the control unit 301 adds XMinus stored in the correction table 305a to the angle around x-axis. Then the process proceeds to step S81.

At step S81, the control unit 301 determines whether the angle around y-axis detected by the accelerometer sensor 117 at step S71 (FIG. 33) exceeds 0 degree or not. If the angle around y-axis exceeds 0 degree (yes at step S81), the process proceeds to step S83. Otherwise (no at step S81), the process proceeds to step S82.

At step S82, the control unit 301 determines whether the angle around y-axis detected by the accelerometer sensor 117 at step S71 (FIG. 33) is less than 0 degree or not. If the angle around y-axis is less than 0 degree (yes at step S82), the process proceeds to step S84. Otherwise (no at step S82), the process returns.

At step S83, the control unit 301 adds YPlus stored in the correction table 305a to the angle around y-axis. Then, the process returns.

At step S84, the control unit 301 adds YMinus stored in the correction table 305a to the angle around y-axis. Then, the process returns.

According to this angle acquisition process, an angle around x-axis is not corrected if this angle is 0 degree. Similarly, an angle around y-axis is not corrected if this angle is 0 degree. However, angles around x- and y-axes of 0 degree may be corrected, setting a condition of whether an angle is 0 degree or greater or a condition of whether an angle is 0 degree or less.

As described above, the fourth embodiment makes it possible to appropriately adjust the change of the display orientation of the display screen 121a of the LCD 121 by correcting a tilt angle of the information processing apparatus 300 detected by the accelerometer sensor 117, depending on changes in tilt of the information processing apparatus 300.

That is to say, it becomes possible to appropriately adjust the change of the display orientation of the display screen 121a of the LCD 121 by determining the state of changes in tilt angle of the information processing apparatus 300, and correcting the tilt angle of the information processing apparatus 300 detected by the acceleration sensor 117 depending on the determination result in such a manner that its absolute value is increased if the changes in tilt angle are small, and is decreased if the changes in tilt angle are large.

If the changes in tilt angle crossed a threshold, the changes in tilt direction and tilt angle are determined large, so as to prevent an auto-rotation of the display orientation from being caused excessively due to changes in tilt angle repeatedly crossing a threshold.

In addition, if the changes in tilt angle continued around but not across a threshold and then crossed the threshold, the changes in tilt direction and tilt angle are determined small. If the user intends to cause an auto-rotation to change the display orientation but his/her tilting the information processing apparatus 300 is not sufficient, a detected tilt angle is corrected so as to easily cause the auto-rotation.

Modification Example of Fourth Embodiment

The following describes a modification example of the fourth embodiment. The following description focuses on different features from the above-described fourth embodiment. The same reference numerals are used here as in the fourth embodiment for corresponding components, and the same features will not be repeatedly described.

What is different from the fourth embodiment is that this modification example corrects a tilt detected by an accelerometer sensor depending on whether changes in tilt angle of an information processing apparatus are large or small, in a screen display orientation control process, as described below with reference to FIGS. 35 and 36.

Figure 35:
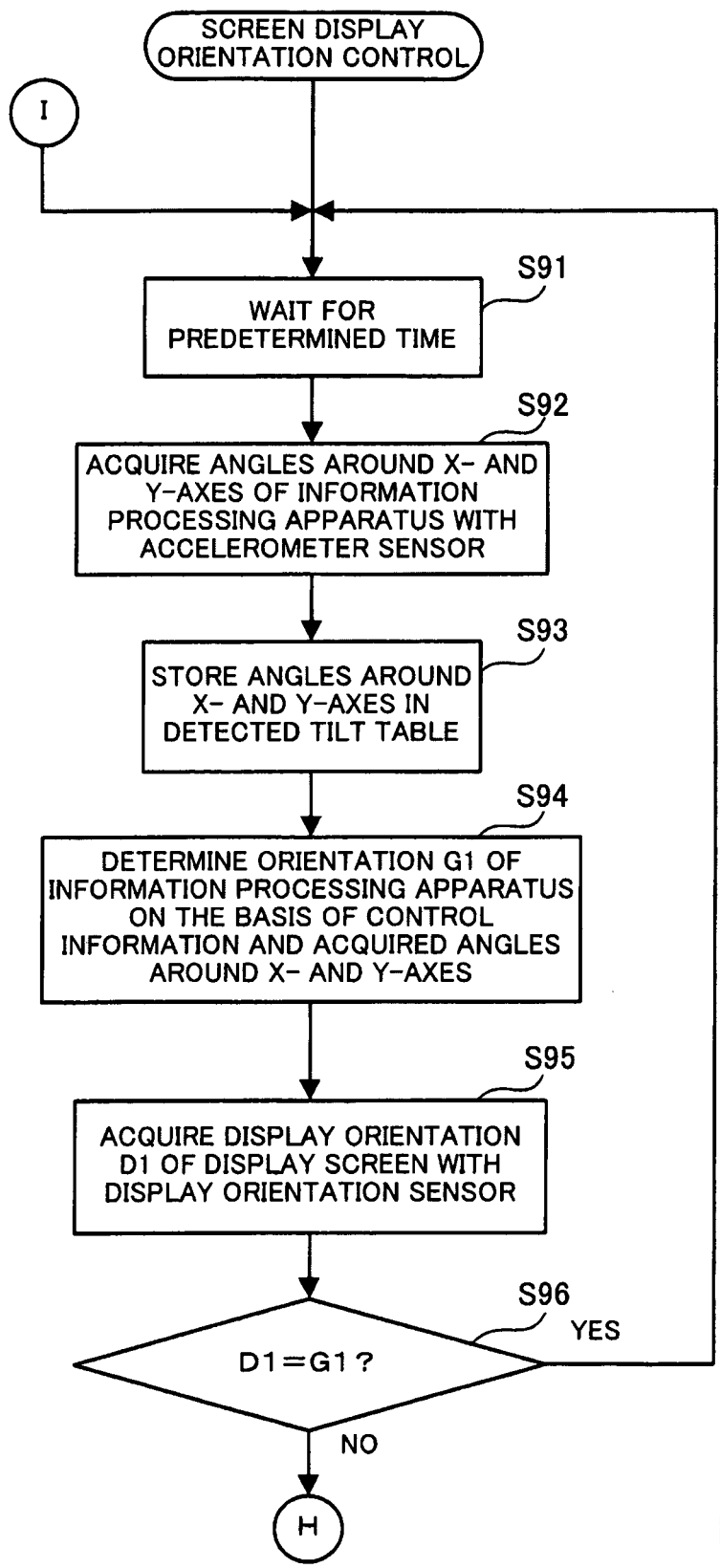
FIGS. 35 and 36 are a flowchart of a screen display orientation control process according to an example modification of the fourth embodiment.
Figure 36:
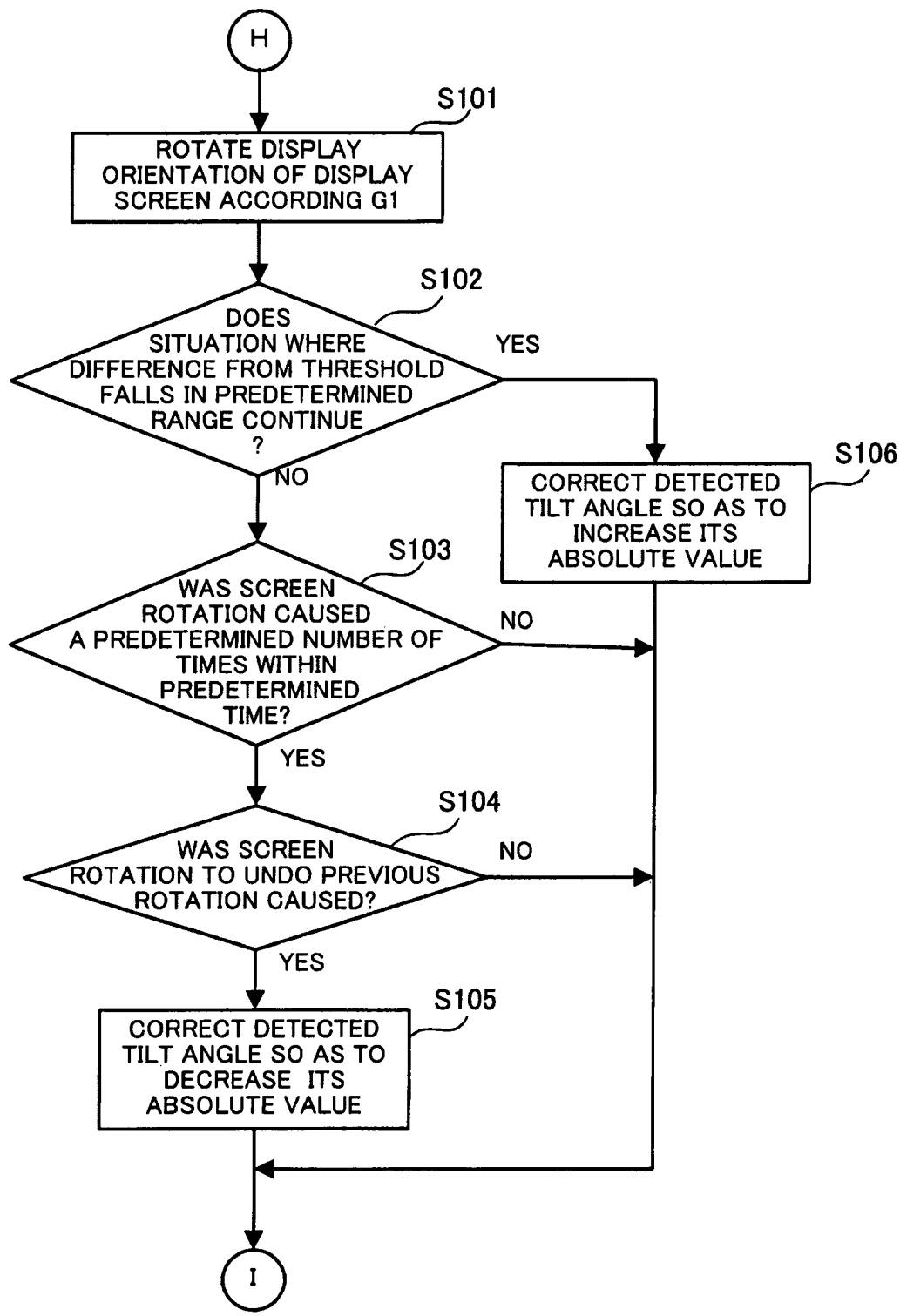

FIGS. 35 and 36 are a flowchart of a screen display orientation control process according to the modification example of the fourth embodiment. An information processing apparatus 300 according to this example performs the screen display orientation control process to control the display orientation of a display screen 121a according to a tilt of the information processing apparatus 300. According to this example, the information processing apparatus 300 performs the screen display orientation control process while displaying the display screen 121a on an LCD 121. The screen display orientation control process will now be described.

At step S91, a control unit 301 waits for a predetermined time (for example, 0.1 second). Thereby, a process of detecting a tilt of the information processing apparatus 300 and changing the display orientation of the display screen 121a is performed at predetermined intervals.

At step S92, the control unit 301 causes the accelerometer sensor 117 to detect a tilt of the information processing apparatus 300, and acquires angles around x- and y-axes representing the detected tilt of the information processing apparatus 300.

At step S93, the control unit 301 stores the angles around x- and y-axes, detected at step S92, in a detected tilt table 104a.

At step S94, the control unit 301 determines G1 representing an orientation of the information processing apparatus 300 on the basis of the thresholds of the control information stored in the control table 103a and the angles around x- and y-axes acquired at step S92.

At step S95, the control unit 301 causes the display orientation sensor 102 to detects current display orientation of the display screen 121a, and acquires D1 representing the detected current display orientation of the display screen 121a.

At step S96, the control unit 201 determines whether G1 determined at step S94 matches D1 acquired at step S95. If G1 and D1 match (yes at step S96), the process goes back to step S91. Otherwise (no at step S96), the process proceeds to step S101 (FIG. 36).

At step S101, the control unit 301 rotates the display orientation of the display screen 121a according to G1 representing the orientation of the information processing apparatus 300.

More specifically, if G1 representing an orientation of the information processing apparatus 300 is "0 degree" (that is, the downward direction of the information processing apparatus 300 matches the vertical downward direction), the control unit 301 displays the display screen 121a so that D1="0 degree", i.e., the downward direction of the display screen 121a matches the downward direction of the information processing apparatus 300. If G1 is "−90 degrees" (that is, the downward direction of the information processing apparatus 300 matches the user's left-hand direction), the control unit 301 displays the display screen 121a such that D1="−90 degrees", i.e., the downward direction of the display screen 121a matches the rightward direction of the information processing apparatus 300. If G1 is "+180 degrees" (that is, the downward direction of the information processing apparatus 300 matches the vertical upward direction), the control unit 301 displays the display screen 121a so that the D1="+180 degrees", i.e., the downward direction of the display screen 121a matches the upward direction of the information processing apparatus 300. If G1 is "+90 degrees" (that is, the downward direction of the LCD 121 matches the user's right-hand direction), the control unit 301 displays the display screen 121a such that D1="+90 degrees", i.e., the downward direction of the display screen 121a matches the leftward direction of the information processing apparatus 300.

At step S102, the control unit 301 analyzes the tilts of the information processing apparatus 300 stored in the detected tilt table 104a to determine whether such a situation that the tilts do not reach a threshold for changing the display orientation but a difference between each tilt and the threshold falls in a predetermined range (for example, 10 degrees) continues for a predetermined time (for example, 0.6 second) or longer. If this situation continues for the predetermined time or longer (yes at step S102), the process proceeds to step S106. Otherwise (no at step S102), the process proceeds to step S103.

At step S103, the control unit 301 analyzes the tilts of the information processing apparatus 300 stored in the detected tilt table 104a to determine whether the display orientation was changed a predetermined number of times (for example, twice) or more within a predetermined time (for example, the last one second). If the display orientation was changed the predetermined number of times or more within the predetermined time (yes at step S103), the process proceeds to step S104. Otherwise, (no at step S103), the process goes back to step S91 (FIG. 35).

At step S104, the control unit 301 analyzes the tilts of the information processing apparatus stored in the detected tilt table 104a to determine whether a screen rotation to undo a previous screen rotation was caused. If such a screen rotation was caused (yes at step S104), the process proceeds to step S105. Otherwise, (no at step S104), the process goes back to step S91.

In this connection, the situation where a screen rotation to undo a previous screen rotation is caused means that a display orientation is changed once and then returns back to a previous one because at least one of angles around x- and y-axes of the information processing apparatus crosses the same threshold twice within a predetermined time (for example, the last one second), changing above and below the threshold.

At step S105, the control unit 301 corrects the detected tilt angle on the basis of the correction information stored in a correction information storage unit 305 so as to decrease its absolute value. More specifically, in the case where it is determined at step S104 that the screen rotation to undo a previous screen rotation was caused on the basis of the tilt angles around x-axis and the thresholds, the control unit 301 according to this modification example of the fourth embodiment adds a negative value (XMinus) indicated in the correction information to the detected angle around x-axis if this angle is a positive value, and adds a positive value (XPlus) indicated in the correction information to the detected angle around x-axis if this angle is a negative value. On the other hand, in the case where it is determined at step S104 that the screen rotation to undo a previous screen rotation was caused on the basis of the tilt angles around y-axis and the thresholds, the control unit 301 according to this modification example of the fourth embodiment adds a negative value (YMinus) indicated in the correction information to the detected angle around y-axis if this angle is a positive value, and adds a positive value (YPlus) indicated in the correction information to the detected angle around y-axis if this angle is a negative value. Then, the process goes back to step S91.

At step S106, the control unit 301 corrects the detected tilt angle on the basis of the correction information stored in the correction information storage unit 305 so as to increase its absolute value. More specifically, the control unit 301 according to this modification example of the fourth embodiment adds a positive value (XPlus) indicated in the correction information to the detected angle around x-axis if this angle is a positive value, and adds a negative value (XMinus) indicated in the correction information to the detected angle around x-axis if this angle is a negative value. On the other hand, the control unit 301 adds a positive value (YPlus) indicated in the correction information to the detected angle around y-axis if this angle is a positive value, and adds a negative value (YMinus) indicated in the correction information to the detected angle around y-axis if this angle is a negative value. Then, the process goes back to step S91.

As described above, the modification example of the fourth embodiment makes it possible to appropriately adjust the change of the display orientation of the display screen 121a of the LCD 121 by correcting a tilt angle of the information processing apparatus 300 detected by the accelerometer sensor 117 depending on changes in tilt of the information processing apparatus 300.

That is to say, it becomes possible to appropriately adjust the change of the display orientation of the display screen 121a of the LCD 121 by determining the state of changes in tilt angle of the information processing apparatus 300, and correcting a tilt angle of the information processing apparatus 300 detected by the acceleration sensor 117 depending on the determination result in such a way that its absolute value is increased if the changes in tilt angle are small, and is decreased if the changes in tilt angle are large.

If changes in tilt angle crossed a threshold, the changes in tilt direction and tilt angle are determined large, so as to prevent an auto-rotation of the display orientation from being caused excessively due to changes in tilt angle repeatedly crossing a threshold.

In addition, if changes in tilt angle continued around but not across a threshold and then crossed the threshold, the changes in tilt direction and tilt angle are determined small. In the case where the user intends to cause an auto-rotation to change the display orientation but his/her tilting the information processing apparatus 300 is not sufficient, a detected tilt angle is corrected so as to easily cause the auto-rotation.

The processing functions described above can be realized by a general computer. In this case, a program is prepared, which describes processes for the functions of the information processing apparatus 100 to be performed. The program is executed by a computer, whereupon the aforementioned processing functions are accomplished by the computer.

The program describing the processes may be recorded on a computer-readable recording medium. Computer-readable recording media include magnetic recording devices, optical discs, magneto-optical recording media, semiconductor memories, etc. The magnetic recording devices include HDDs, Flexible Disks (FD), magnetic tapes (MT), etc. The optical discs include Digital Versatile Discs (DVD), DVD-RAMs, Compact Disc-Read Only Memories (CD-ROM), CD-R (Recordable)/RW (ReWritable), etc. The magneto-optical recording media include Magneto-Optical disks (MO) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

The proposed electronic device, control program, and control method make it possible to appropriately adjust the change of the display orientation of a display screen.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An electronic device comprising:
a display device to display information;
a tilt sensor to detect a tilt direction and tilt angle of the display device with respect to a vertical downward direction;
a memory to store detected tilt data that indicates a history of tilt directions and tilt angles detected by the tilt sensor and control information indicating correlations between display orientations of the display device and tilts of the electronic device to be detected by the tilt sensor and a threshold of the tilt direction and tilt angle detected by the tilt sensor for determining whether to change the display orientation of the display device; and
a processor to analyze the detected tilt data to capture a state of changes of the tilt angles detected by the tilt sensor, modify the control information, the tilt direction and tilt angle detected by the tilt sensor, or a combination thereof, depending on the captured state of the changes of the tilt angles, and change a display orientation of the display device on the basis of a result of the modification, wherein:
the memory stores the detected tilt data that indicates the changes of the tilt directions and tilt angles detected at a predetermined number of past time points; and
the processor analyzes the detected tilt data to capture the state of the changes of the tilt angles detected by the tilt sensor, modifies the control information so that a smaller change in tilt angle than a predetermined value causes a change of the display orientation of the display device in a case where the state of the changes of the tilt angles is a first state and that a larger change in tilt angle than the predetermined value causes the change of the display orientation of the display device in a case where the state of the changes of the tilt angles is a second state, and changes the display orientation of the display device on the basis of the modified control information, and the tilt direction and tilt angle,
wherein the first state is a state where a tilt angle indicated by the detected tilt data exceeds the threshold after a predetermined time period during which prior tilt angles to the tilt angle do not reach the threshold and a difference between each of the prior tilt angles and the threshold falls in a predetermined range smaller than the threshold, and wherein the second state is a state where the changes of the tilt angles are larger than the changes of the tilt angles of the first state.

2. The electronic device according to claim 1, wherein:

the memory stores first control information and second control information both of which indicate correlations between the tilts of the own electronic device and the display orientations of the display device, the second control information allowing a larger change in tilt angle of the own electronic device than the first control information to cause the change of the display orientation of the display device;

the detected tilt data indicates the changes of the tilt directions and tilt angles detected at a predetermined number of past time points; and the processor analyzes the detected tilt data to capture the state of the changes of the tilt angles detected by the tilt sensor, determines to use the first control information as the control information in changing the display orientation of the display device in a case where the state of the changes of the tilt angles is a first state and to use the second control information as the control information in a case where the state of the changes of the tilt angles is a second state larger than the first state, and changes the display orientation of the display device on the basis of the determined one of the first control information and second control information, and the tilt direction and tilt angle.

3. The electronic device according to claim 1, wherein:

the memory stores correction information that corrects the tilt angle detected by the tilt sensor in such a way that an absolute value of the detected tilt angle is increased in a case where the changes indicated by the detected tilt data are small and the absolute value is decreased in a case where the changes indicated by the detected tilt data are large, wherein:

the detected tilt data indicates the changes of the tilt directions and tilt angles detected at a predetermined number of past time points, and the processor analyzes the detected tilt data stored in the memory to capture the state of the changes of the tilt angles, corrects the tilt angle with the correction information depending on the captured state of the changes of the tilt angles, and changes the display orientation of the display device on the basis of the control information stored in the memory, the tilt direction, and the corrected tilt angle.

4. The electronic device according to claim 1, wherein:

the memory stores the detected tilt data that indicates the changes of the tilt directions and tilt angles detected at a predetermined number of past time points; and the processor analyzes the detected tilt data stored in the memory, and determines that the state of the changes of the tilt angles is the second state in a case where the changes of the tilt angles cross the threshold.

5. A non-transitory computer-readable medium storing a control program causing a computer to operate as:

a display device to display information;

a tilt sensor to detect a tilt direction and tilt angle of the display device with respect to a vertical downward direction; and a processor to analyze detected tilt data stored in a memory to capture a state of changes of tilt angles detected by the tilt sensor, modify control information, the tilt direction and tilt angle detected by the tilt sensor, or a combination thereof, depending on the captured state of the changes of the tilt angles, and change a display orientation of the display device on the basis of a result of the modification, the detected tilt data indicating a history of tilt directions and tilt angles detected by the tilt sensor, the control information indicating correlations between display orientations of the display device and tilts of an own computer to be detected by the tilt sensor and a threshold of the tilt direction and tilt angle detected by the tilt sensor for determining whether to change the display orientation of the display device, wherein:

the memory stores the detected tilt data that indicates the changes of the tilt directions and tilt angles detected at a predetermined number of past time points; and the processor analyzes the detected tilt data to capture the state of the changes of the tilt angles detected by the tilt sensor, modifies the control information so that a smaller change in tilt angle than a predetermined value causes a change of the display orientation of the display device in a case where the state of the changes of the tilt angles is a first state and that a larger change in tilt angle than the predetermined value causes the change of the display orientation of the display device in a case where the state of the changes of the tilt angles is a second state, and changes the display orientation of the display device on the basis of the modified control information, and the tilt direction and tilt angle, wherein the first state is a state where a tilt angle indicated by the detected tilt data exceeds the threshold after a predetermined time period during which prior tilt angles to the tilt angle do not reach the threshold and a difference between each of the prior tilt angles and the threshold falls in a predetermined range smaller than the threshold, and wherein the second state is a state where the changes of the tilt angles are larger than the changes of the tilt angles of the first state.

6. A control method for a computer to perform:

detecting a tilt direction and tilt angle of a display device that displays information, with respect to a vertical downward direction;

analyzing detected tilt data stored in a memory to capture a state of changes of detected tilt angles, the detected tilt data indicating a history of detected tilt directions and tilt angles;

modifying control information stored in the memory, the detected tilt direction and tilt angle, or a combination thereof, depending on the captured state of the changes of the detected tilt angles, the control information indicating correlations between display orientations of the display device and tilts of an own computer to be detected and a threshold of the tilt direction and tilt angle detected by the detecting for determining whether to change display orientation of the display device; and changing the display orientation of the display device on the basis of a result of the modification, wherein:

the memory stores the detected tilt data that indicates the changes of the tilt directions and tilt angles detected at a predetermined number of past time points; and the analyzing analyzes the detected tilt data to capture the state of the changes of the tilt angles detected by the tilt sensor, modifies the control information so that a smaller change in tilt angle than a predetermined value causes a change of the display orientation of the display device in a case where the state of the changes of the tilt angles is a first state and that a larger change in tilt angle than the predetermined value causes the change of the display orientation of the display device in a case where the state of the changes of the tilt angles is a second state, and changes the display orientation of the display device on the basis of the modified control information, and the tilt direction and tilt angle, wherein the first state is a state where a tilt angle indicated by the detected tilt data exceeds the threshold after a predetermined time period during which prior tilt angles to the tilt angle do not reach the threshold and a difference between each of the prior tilt angles and the threshold falls in a predetermined range smaller than the threshold, and, wherein the second state is a state where the changes of the tilt angles are larger than the changes of the tilt angles of the first state.

* * * * *